(12) United States Patent
Ghosh

(10) Patent No.: US 8,452,803 B2
(45) Date of Patent: May 28, 2013

(54) METHOD AND SYSTEM FOR DISTRIBUTED DATA MANAGEMENT OF PERSONAL DATA IN A SOCIAL NETWORKING CONTEXT

(76) Inventor: Samir Ghosh, San Francisco, CA (US)

( * ) Notice: Subject to any disclaimer, the term of this patent is extended or adjusted under 35 U.S.C. 154(b) by 509 days.

(21) Appl. No.: 12/386,435

(22) Filed: Apr. 17, 2009

(65) Prior Publication Data

US 2009/0271409 A1 Oct. 29, 2009

Related U.S. Application Data

(60) Provisional application No. 61/125,792, filed on Apr. 29, 2008.

(51) Int. Cl.
*G06F 7/00* (2006.01)
*G06F 17/00* (2006.01)
*G06F 17/30* (2006.01)

(52) U.S. Cl.
USPC ............................ 707/769; 707/781; 709/217

(58) Field of Classification Search
None
See application file for complete search history.

(56) References Cited

U.S. PATENT DOCUMENTS

| 7,783,710 | B2 * | 8/2010 | Ramaswamy | 709/206 |
| 7,873,665 | B2 * | 1/2011 | Gonzalez | 707/791 |
| 7,912,762 | B2 * | 3/2011 | Sirota | 705/26.5 |
| 2005/0283497 | A1 * | 12/2005 | Nurminen et al. | 707/104.1 |
| 2008/0172361 | A1 * | 7/2008 | Wong et al. | 707/3 |

OTHER PUBLICATIONS

Zijlstra, "How to Get P2P Social Networking", Oct. 22, 2005, http://www.zylstra.org/blog/archives/2005/10/how_to_get_p2p_1.html.
Mann, "Distributed Social Networking", Oct. 24, 2005, http://bmannconsulting.com/blog/bmann/distributed-social-networking.
Paap, "Federated Social Networks (FSN)", Dec. 12, 2007, http://www.mediamatic.net/page/26902/en.
Peek et al., "Federating Social Networks—The Technology", Dec. 5, 2007, http://www.mediamatic.net/page/26386/en.
Peek et al., "Federating Social Networks—What was it for?", Dec. 11, 2007, http://www.mediamatic.net/page/26604/en.
Hane, "Opencola Launches Personal Knowledge Manager", Nov. 11, 2002, http://newsbreaks.infotoday.com/nbreader.asp?ArticleID=17047.
MacManus, "Krawler[x]—Social Network + Peer to Peer", Jul. 25, 2006, http://blogs.zdnet.com/web2explorer/?p=244.
Ripeanu, "Peer-to-Peer Architecture Case Study—Gnutella Network", TR-2001-26, Univ. of Chicago, Jul. 24, 2001, http://people.cs.uchicago.edu/~matei/PAPERS/gnutella-rc.pdf.
Chen et al., "Maze: a Social Peer-to-peer Networking", IEEE Int'l. Conf. on E-Commerce Technology for Dynamic E-Business, Sep. 2004, pp. 290-293.

* cited by examiner

*Primary Examiner* — Loan T Nguyen
(74) *Attorney, Agent, or Firm* — Donald R. Boys; Central Coast Patent Agency, Inc.

(57) ABSTRACT

A receiving user receives an electronic message from an originating user such that the electronic message contains a data directive that requests a data transfer to/from the receiving user and the originating user. In response to receiving the electronic message, access privileges for the originating user are determined at the receiving computer with respect to access privilege parameters that have been specified by the receiving user. One or more remote and/or local datastores are accessed in order to read and/or write data in accordance with the determined access privileges and the requested data transfer. A response message may be returned to the originating user. One or more new request messages may be sent by the receiving user to other users, wherein each new request message includes the data directive.

23 Claims, 7 Drawing Sheets

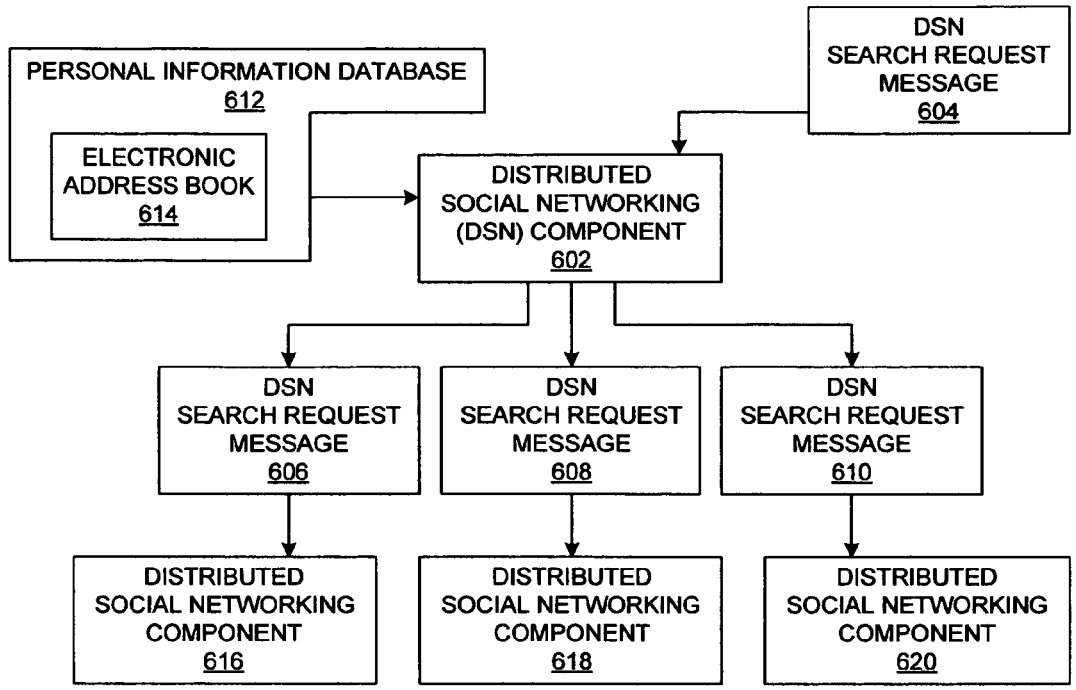
FIG. 6
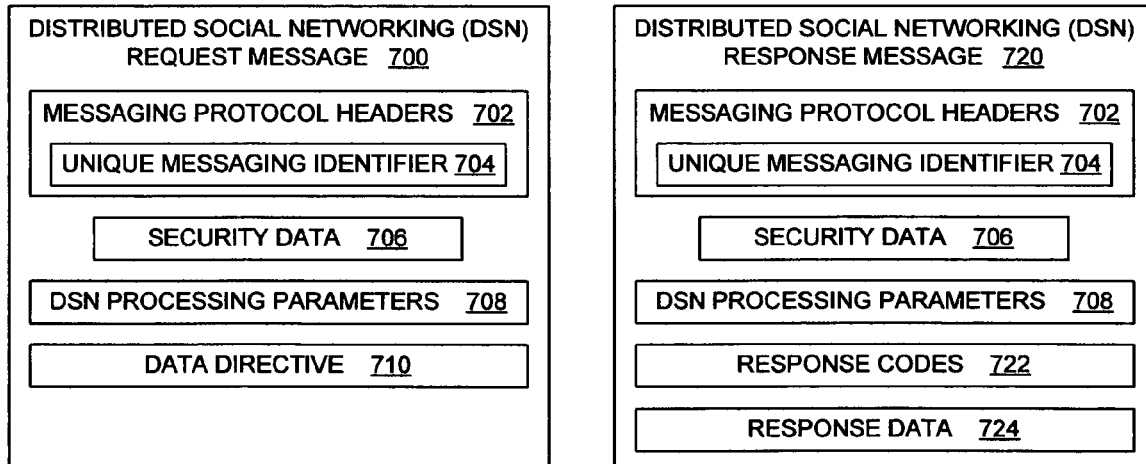
FIG. 7A  FIG. 7B

METHOD AND SYSTEM FOR DISTRIBUTED DATA MANAGEMENT OF PERSONAL DATA IN A SOCIAL NETWORKING CONTEXT

CROSS REFERENCE TO RELATED APPLICATION

This application is based upon and claims benefit of copending co-owned U.S. Provisional Patent Application Ser. No. 61/125,792 entitled "Method for Automatically Propagating and Processing Instructions and Queries Across an Autonomous Social Network" filed with the U.S. Patent and Trademark Office on Apr. 29, 2008 by the inventor herein, the specification of which is incorporated herein by reference.

BACKGROUND OF THE INVENTION

1. Field of the Invention

The present invention relates to an improved data processing system and, specifically, to a method and apparatus for multicomputer data transferring and database management. In particular, the present invention provides a method and apparatus for computer-to-computer data transfer in conjunction with database management, and still more particularly, within the context of social networking.

2. Description of Related Art

The field of electronic social networking has received much attention recently with the success of the Internet sites of social networking services, such as LinkedIn™ and Facebook™. The purpose of these sites is to leverage the Internet in creating social networks in which associations or "links" between persons are represented by data that is managed by the social networking service; a set of such associations represents an ad-hoc social network.

Typically, an ad-hoc social network is created in a two-step process. First, a social networking service operates by requiring a user to register on the website of the service. Second, the user may then invite other persons, if not already registered, to register with the service and subsequently connect or link to the user, i.e., create an association between themselves and the user. In this manner, the network continues to grow as each user invites other people to join, and they may then link to each other if they choose.

U.S. Pat. No. 7,069,308, takes this two-step process one step farther by allowing for "degrees of separation". According to the method in this patent, social networks are created as with other electronic social networking services. In addition, instead of merely providing a mechanism for one registrant to connect to another registrant, a communication tool is provided so that a registrant (R0) can "introduce" a first registrant (R1) of their network to a second registrant (R2) of their network. In turn, R2 can introduce R1 to a third registrant (R3) who is a member of R2's network. In this way, R1 is introduced to R3 even though R1 and R3 are not directly linked to each other. They are, in fact, linked through R0 and R2.

As described hereinabove, when a user tries to connect to other people through a social networking service, the user can only connect with other users who are already in the social networking service's database; otherwise, the user must invite those other people to join the social networking service. In other words, if a user searches the social networking service's database in an attempt to link to a known person, the user can only find other users who are already in the social networking service's database. Entries within the database are created during the registration process; registration on a website of a social networking service creates a personal profile that represents the user to some degree in an electronic manner within a database. The personal profile contains personal data that is stored within a database that is managed by the social networking service.

Hence, a user must entrust the social networking service with management of personal data to some degree. Moreover, at some point in time, invited users must also register with the social networking service before they can link with an inviting user, and the invited users must also entrust the social networking service with management of personal data. Clearly, the value of any current social networking service is directly proportional to the willingness of users to entrust management over copies of their personal data by the social networking service.

To facilitate the ability of a user to connect with friends, family, and colleagues, some social networking sites allow a user to upload a list of their personal contacts to the service's website, e.g., names and associated email addresses from an electronic address book. However, this action also requires the user to entrust one's valuable contact information to a third party, i.e., the social networking service. Thus, a user must relinquish additional control over some of their personal information in order to take advantage of such features of the social networking service.

Although the ability of persons to electronically associate with each other in a social networking service through the Internet is very useful, the prior art methodology for doing so has the disadvantage of requiring each user to register with the social networking service, thereby entrusting management of some of the users' personal data to the social networking service. If a person is unwilling to trust a social networking service and does not register with the service, then the users of the service cannot communicate with that untrusting person through the service. Distrust of a social networking service by some potential users limits the efficacy of the service because some users will have valuable personal relationships with those untrusting persons, and those valuable personal relationships will remain unrepresented within the social networking service.

As modern society has progressed in the last few decades, the efficiency of the modern economy has relied upon digital data processing, wherein members of modern society are represented, to an ever increasing extent, as digital data. The financial, commercial, social, and governmental actions, events, and behaviors of everyone are captured as digital data in a variety of databases that are controlled by various entities. For most people, the ability to control their personal data is very limited. Although there are some statutory and regulatory controls on the manner in which private and public entities are allowed to capture, hold, and process such data, each person's relatively minor control over his or her own personal digital data is a burden that one must bear in order to participate in modern society, e.g., using the current social networking services as described above.

It would be advantageous to have a method and an apparatus in which functionality for electronic social networking is provided without a requirement for users to register with a social networking service, thereby alleviating users of the burden of entrusting management of personal data to a social networking service. It would be further advantageous to provide functionality in which users have the ability to control management of personal data for social networking purposes throughout a variety of datastores rather than requiring the storage of personal data within a centralized database.

SUMMARY OF THE INVENTION

A receiving user receives an electronic message from an originating user such that the electronic message contains a data directive that requests a data transfer to/from the receiving user and the originating user. In response to receiving the electronic message, access privileges for the originating user are determined at the receiving computer with respect to access privilege parameters that have been specified by the receiving user. One or more remote and/or local datastores are accessed in order to read and/or write data in accordance with the determined access privileges and the requested data transfer. A response message may be returned to the originating user. One or more new request messages may be sent by the receiving user to other users, wherein each new request message includes the data directive.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 6 illustrates a block diagram that depicts a replication and subsequent decentralized distribution of social networking messages within a distributed social networking environment that is implemented in accordance with an embodiment of the present invention;

FIG. 7A illustrates a block diagram that depicts an exemplary format for a DSN (distributed social networking) request message that may be used to communicate between users of an implementation of the distributed social networking functionality of the present invention;

FIG. 7B illustrates a block diagram that depicts an exemplary format for a DSN response message that may be used to communicate between users of an implementation of the distributed social networking functionality of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
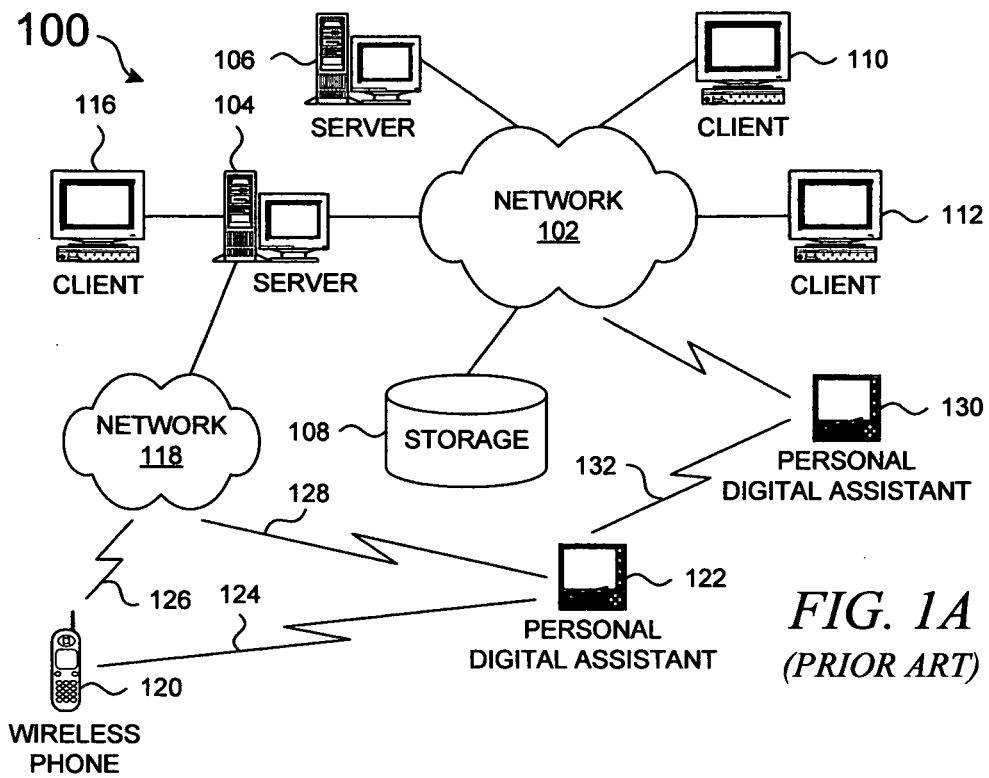
FIG. 1A depicts a typical prior art network of data processing systems, networks, and storage devices, any of which may support at least a portion of an implementation of the present invention.

With reference now to the figures, FIG. 1A depicts a typical prior art network of data processing systems, networks, and storage devices, each of which may support at least a portion of an implementation of the present invention. Distributed data processing system 100 contains network 102, which is a medium that may be used to provide communications links between various devices and computers connected together within distributed data processing system 100. Network 102 may include permanent connections, such as wire or fiber optic cables, or temporary connections made through telephone or wireless communications. In the depicted example, server 104 and server 106 are connected to network 102 along with storage unit 108. In addition, clients 110-112 also are connected to network 102. Clients 110-112 and servers 104-106 may be represented by a variety of computing devices, such as mainframes, personal computers, personal digital assistants (PDAs), other mobile devices, etc. Distributed data processing system 100 may include additional servers, clients, routers, other devices, and peer-to-peer architectures that are not shown. In general, a variety of computing devices may be commonly recognized as a generic computer, wherein a computer comprises at least some form of memory for storing data and/or instructions and a central processing unit for executing instructions.

In the depicted example, distributed data processing system 100 may include the Internet with network 102 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 104 directly supports client 116 and network 118; network 118 incorporates wireless communication links. Network-enabled phone 120 and PDA 122 can directly transfer data between themselves across wireless link 124 using an appropriate technology, e.g., via Bluetooth™ wireless technology or Wi-Fi technology (IEEE 802.11) that allows the creation of so-called personal area networks (PAN) or personal ad-hoc networks. Phone 120 connects to network 118 through wireless link 126, and PDA 122 connects to network 118 through wireless link 128. In a similar manner, PDA 122 can transfer data to PDA 130 via wireless link 132.

The present invention could be implemented on a variety of hardware platforms; FIG. 1A is intended as an example of a heterogeneous computing environment and not as an architectural limitation for the present invention.

Figure 1B:
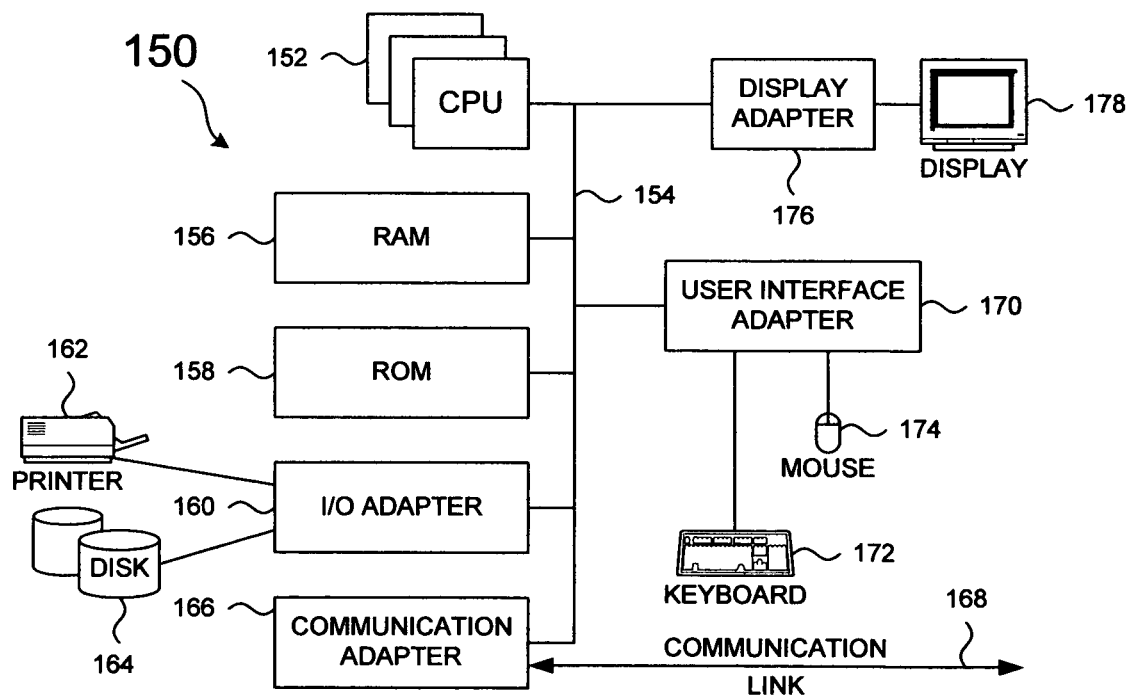
FIG. 1B depicts a typical prior art computer architecture that may be used within a data processing system in which the present invention may be implemented.

With reference now to FIG. 1B, a diagram depicts a typical prior art computer architecture of a data processing system, such as those shown in FIG. 1A, in which the present invention may be implemented. Data processing system 150 contains one or more central processing units (CPUs) 152 that are connected to internal system bus 154, which interconnects random access memory (RAM) 156, read-only memory 158, and input/output adapter 160, which supports various I/O devices, such as printer 162, disk units 164, or other devices not shown, such as an audio output system, etc. System bus 154 also connects communication adapter 166 that provides access to communication link 168. User interface adapter 170 connects various user devices, such as keyboard 172 and mouse 174, or other devices not shown, such as a touch screen, stylus, microphone, etc. Display adapter 176 connects system bus 154 to display device 178.

Those of ordinary skill in the art will appreciate that the hardware in FIG. 1B may vary depending on the system implementation. For example, the system may have one or more processors, such as an Intel® x86-architecture-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments, possibly in conjunction with other software applications, such as email clients. A typical operating system may be used to control program execution within each data processing system. For example, one device may run a Microsoft Windows® operating system, while another device contains a simple Java® runtime environment. A representative computer may include a browser, which is a well known software application for accessing hypertext documents in a variety of formats, such as graphic files, word processing files, Extensible Markup Language (XML), Hypertext Markup Language (HTML), and other file formats.

The present invention may be implemented on a variety of hardware and software platforms, as described above with respect to FIG. 1A and FIG. 1B. More specifically, though, the present invention is directed to an improved data processing environment in which users interact with each other in an electronic social networking context. Various embodiments of the present invention are explained in more detail hereinbelow with respect to the remaining figures.

Figure 2:
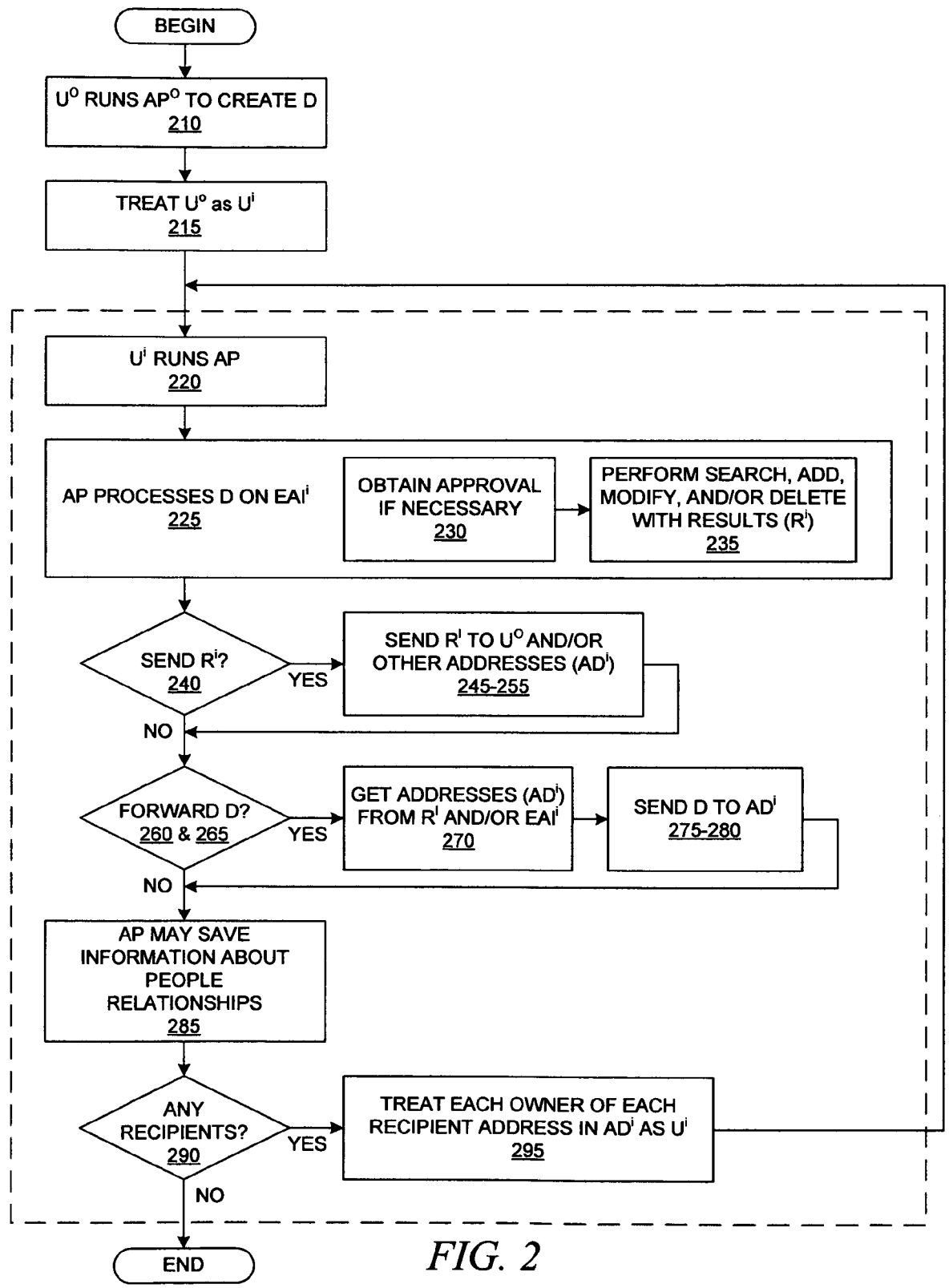
FIG. 2 illustrates a flowchart that depicts a process in which messages are passed between users in an electronic social networking context in accordance with an embodiment of the present invention.

With reference now to FIG. 2, a flowchart depicts a process in which messages are passed between users in an electronic social networking context in accordance with an embodiment of the present invention. At step 210, a user ($U^o$) runs an application program ($AP^o$) on $U^o$'s computer, mobile device or the Internet to create a directive (D). The directive D includes a combination of criteria (DC) that describes how to find existing data, instructions (DI) for what to do with that data, data values (DV), and/or customized message text. The directive D need not be only in words, but may include images.

At step 215, $U^o$ is treated as $U^i$.

At step 220, the application program AP runs on $U^i$'s computer, mobile device or on the Internet.

At step 225, the application program AP processes the directive D on $EAI^i$ (Electronically Accessible Information). The $EAI^i$ is any electronic information that is accessible to the application program AP and includes, but is not limited to, data on $U^i$'s computer. $U^i$ is given the option of selecting which data in $EAI^i$ is available to the application program AP and may choose to keep certain data inaccessible to the application program AP. $U^i$'s selection may be stored for future use by the application program AP.

For example, the $EAI^i$ may include $U^i$'s Microsoft Outlook® Contacts database (address book), Microsoft Office® documents, Intuit Quicken® data files, mobile phone address book, instant message buddy lists and $U^i$'s social networks on the Internet such as LinkedIn®, social networks accessible via Google® OpenSocial, and online address books such as on Yahoo® or Gmail.

At step 230, the application program AP may first obtain approval, or use prior approval, from $U^i$ to process the directive D.

At step 235, if DI includes instructions to search, add, modify, and/or delete data in $EAI^i$, then application program AP uses DC to find the appropriate data in $EAI^i$ and uses DV, if necessary, to add, modify and/or delete the data respectively. The results ($R^i$) is the outcome of this operation.

For example, the directive D may contain instructions to modify $U^o$'s phone number in $EAI^i$ and to search $EAI^i$ for a person providing babysitting services. The application program AP would: (a) update the phone number in the contact record(s) within $EAI^i$ that corresponds to $U^o$ (e.g., by matching name or some unique identifier such as email address); and (b) return the address or contact information of people providing babysitting services as part of $R^i$.

At step 240, a decision is made about whether or not to send $R^i$. If the decision is no, then processing proceeds to step 260. However, if the decision is yes, then at step 245, the application program AP, with or without $U^i$'s current or previous approval, may or may not send $R^i$ to $U^o$ as in steps 250-255. At step 250, the application program AP, with or without $U^i$'s input, may select one or more addresses ($AD^i$) from $EAI^i$. Each address in $AD^i$ may or may not be selected or previously selected or specified by $U^i$. At step 255, the application program AP, with or without $U^i$'s input, may send $R^i$ to one or more addresses ($AD^i$) from $EAI^i$. For example, $U^i$ may instruct AP to send $R^i$ (e.g., babysitters' names and contact info) back to $U^o$.

At step 260, a decision is made about whether or not to forward the directive D. As part of this decision-making process, at step 265, the application program AP may use its own logic, may use information in the directive D, may ask $U^i$, and/or may use prior instructions from $U^i$ in order to determine whether to forward the directive D or not. If the decision is no, then processing proceeds to step 285. However, if the decision is yes, then processing proceeds through steps 270-280.

At step 270, the application program AP, with or without $U^i$'s input, may select one or more addresses ($AD^i$) from $R^i$ and/or $EAI^i$. Each address in $AD^i$ may or may not be selected or previously selected or specified by $U^i$.

At step 275, the application program AP may electronically send the directive D, and/or part or all of $R^i$ and/or info about $U^o$ and/or $U^i$ to $AD^i$.

At step 280, since the recipients corresponding to the addresses in $AD^i$ may not yet have installed or used the application program AP, the application program AP may add to the directive D instructions about how to install and/or use the application program AP. For example, $U^i$ may instruct the application program AP to forward the directive D and $U^o$'s address and contact information on to one or more addresses in $R^i$ (e.g., babysitters). As another example, if the directive D has only been forwarded two times before $U^i$ received the directive D, then the application program AP may automatically forward the directive D to all addresses found in $EAI^i$ where the addresses correspond to other users of the application program AP.

At step 285, based on information in $EAI^i$ and/or information provided by $U^i$, the application program AP may record and store explicit or implicit information about the users, such as relationship information between people. This information might be stored on $U^i$'s computer or on another device, such as a centralized server. For example, if the directive D includes instructions to modify $U^o$'s phone number in $U^i$'s address book, the application program AP may also record in $U^i$'s address book that $U^o$ is a user of the application program AP. As another example, if $U^i$ forwards the directive D on $AD^i$, the application program AP may record this fact for future statistics or intelligent forwarding.

At step 290, a decision is made as to whether there are any recipients defined. If recipients are defined, then at step 295, treat each recipient that elects to use the application program AP as $U^i$ and continue the process as in step 220; otherwise, the process is concluded.

FIG. 2 is a flowchart that represents one embodiment of the present invention; two examples of the operation of this embodiment are provided immediately hereinbelow.

For example, John is a user who is looking for an introduction to the Vice President of Marketing at Acme Corp. He creates an introduction request via an add-in in his Microsoft Outlook® and enters these criteria. He then selects email addresses from his Outlook® contacts and sends this introduction request by email via the add-in. Another instance of the same add-in running on Sally's computer receives John's request and searches Sally's contacts in her Outlook®, on her PC, and in all of her online contact lists. None are found, so Sally never sees the introduction request. Similarly, the add-in on Adam's computer receives John's request but finds a matching contact, so the add-in puts the request as a new email into Adam's inbox. The add-in then gives Adam the choice of ignoring the request, sending the matching contact information back to John, and/or forwarding the request on to other contacts of Adam.

As another example, Doug is a user who is a dentist. He updates his profile, adding that he is a dentist and looking for new business, clicks "Save & Distribute", and picks addresses to whom to send this update. Tina's web-mail account receives Doug's update and automatically updates Tina's contact database with Doug's information. Belinda wants dentist recommendations. She sends out an introduction request via a mobile text message to all of her graduate school alumni, including Tina. Tina's web-mail account receives Belinda's introduction request and finds Doug's record as a match and notifies Tina. With a single click, Tina forwards Doug's contact information to Belinda.

Figure 3:
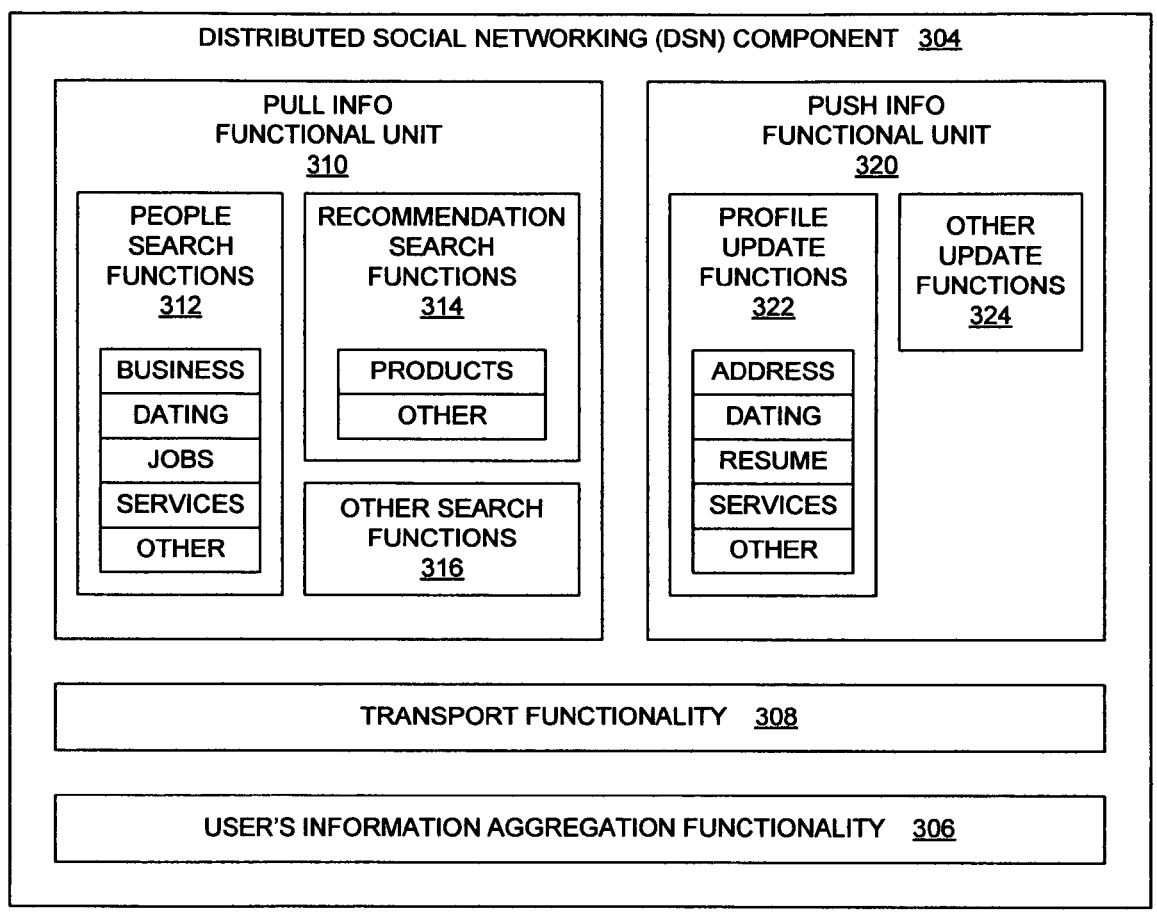
FIG. 3 illustrates a block diagram that depicts a logical organization of functional units that may be employed within a personal social networking agent in an embodiment of the present invention.

With reference now to FIG. 3, a block diagram depicts a logical organization of functional units that may be employed within a personal social networking agent in an embodiment of the present invention. More specifically, FIG. 3 provides an overview of a possible deployment of the present invention in order to describe some examples of the types of data that may be processed while using the present invention. Distributed social networking (DSN) component 304 comprises multiple functions and/or functional units; DSN component 304 is also described in further detail in subsequent figures, e.g., as equivalent DSN component 404 in FIG. 4 or DSN component 804 in FIG. 8.

User's information aggregation functionality 306 represents functions and/or functional units that are able to identify and to access all or portions of the information that a user owns or to which the user has access. This information includes data on the user's physical devices, such as personal computer, mobile phone, etc., and/or data owned or accessible by the user but hosted on other devices, e.g., on the Internet or on the World Wide Web or anywhere that a program may access data on the user's behalf. These functions and/or functional units can either assist in finding and/or organizing the user's information or may just securely represent the user as an agent in order to access the user's data; this may or may not include copying data, e.g., for better performance or per the user's wish to consolidate data sources.

User's information aggregation functionality 306 may also include the ability to data-mine the user's data for meaningful information, e.g., finding contacts or determining relationships between a user's contacts. An advantage of the present invention is that because a user's first-degree of social relationships is already defined in the users' collective address books, there is no need to define these relationships through a web site with its centralized functions of inviting and connecting to people through the control of the web site. In addition, the present invention may include functions so that it is also able to keep track of additional data that is created using its functions, such as supplemental profile data that is not found in an address book contact form.

Transport functionality 308 represents functions and/or functional units to pull/retrieve information, e.g., through query operations or search operations, or to push/store information, e.g., through update operations. Although many different data transport mechanisms may be employed in various implementations or embodiments of the present invention, in an exemplary implementation of the present invention, transport functionality 308 may employ SMTP/POP email. Using email functions in an implementation of the present invention provides several advantages: (1) no infrastructure to build or to operate because of the existing public email infrastructure; (2) automatic built-in queuing capabilities, e.g., if a user is offline, email will queue a query until the user is online; (3) a familiar user interface, e.g., through software client or web-based interface; (4) the ability to be device-agnostic; and (5) the ability to perform ad-hoc networking amongst any users who have access to email functionality.

Pull info functional unit 310 represents those functions and/or functional units that retrieve or pull other users' information. An advantage of the present invention is that users still own and control their own information, unlike in other social networking services that requires a user to redefine or upload contact information and/or connections on a centralized web site. With the present invention, no one ever gets access to a single datum of a user's information without that user's explicit information; this permission may be a one-time grant or may be granted for a longer period to one or more trusted parties.

Another advantage of the present invention is that users can make information requests without fear of imposing on their ad-hoc network of personally connected users as they might in prior art systems when they were to manually send data retrieval requests to users who could not fulfill/satisfy the requests, thereby wasting users' attention. For example, in an embodiment of the present invention, an instance of DSN component 304 intercepts an information retrieval request and only presents it to a receiving user when DSN component 304 has determined that there is a relevant match in the recipient's information, or in the case that forwarding has been requested, possibly only presents it to a receiving user for approval to forward to the next degree of social separation. Compared to prior art systems in which all such requests are handled manually, the present invention has the ability to significantly eliminate messages that other users might consider to be unimportant or irrelevant and therefore distracting.

Pull info functional unit 310 contains a variety of data retrieval functions that may vary amongst different embodiments or implementations of the present invention. For example, FIG. 3 depicts pull info functional unit 310 that contains people search functions 312, recommendation search functions 314, and other search functions 316.

People search functions 312 are one type of information retrieval. If a user is searching for a particular person, e.g., by name, attributes, or role within a company, the user can send out a request message via the transport functionality to one or more people. DSN component 304 of each user, i.e., the instance of a DSN component that is being operated on, or on behalf of, each user, intercepts the request message and searches the user's appropriate aggregate information for potentially matching information. If no matches are found, then there is no need to bother the recipient/receiving user. However, if one or more matches are found, the recipient is notified in an appropriate manner that depends upon the implementation of the present invention; possible subsequent actions may be presented to the receiving user and/or automated actions may be performed for the receiving user, e.g., to send selected matching results back to the requesting user.

People search functions 312 can be performed for many uses, e.g., seeking business contacts, romantic dating, job candidates, or service providers. Business people searches include introductions to people for business purposes, e.g., sales or business development. A user may seek someone by company or by name, e.g., anyone who can provide a warm introduction to a specific person, or by role, e.g., anyone who can provide an introduction to a particular vice-president of marketing at a given Corporation. Romantic dating searches may include finding compatible dates through introductions by mutual friends. Dating search enables a user to request to meet eligible matches based on various criteria, such as dating status, gender, location, age, physical characteristics, interests, etc. Job searches may include the ability to pay finders' fees to employees who refer new job candidates based on the proposition that there is value in the implied endorsement of personal connections. Job candidate searches allow a hiring manager to search his/her contact network for referrals to job candidates who match job criteria, such as location, education, previous employers, availability, required salary range, skills, etc. A service provider search allows a user to rely heavily upon personal referrals from contacts to a variety of service providers, such as doctors, dentists, babysitters, car mechanics, plumbers, etc. Relevant criteria may include the service that is offered and the location. Optionally, the criteria may also include a threshold of ratings by the user's personal connections, e.g., only doctors that my friends have rated as 9-out-of-10. Many other people searches are possible, such as finding similar video game players within my neighborhood or finding similar fine art aficionados around the world.

Recommendation search functions 314 allow for searches of non-people data, such as product recommendations. For example, a user's aggregated information is not limited only to contact information, such as an address book; the information might include access to the user's financial data files. In one case, a requesting user could seek someone that the user knows who has recently purchased a product that the user is contemplating as a purchase; if the user is thinking about buying a new television, the user can find out who the user knows who has recently purchased the same television, thereby getting product feedback. In this manner, the present invention provides the ability to get more meaningful, personal, recommendations than random reviews of the product by strangers on an e-commerce web site.

Other search functions 316 may include a variety of possibilities. For example, one user may request assistance from his/her network for almost anything. For example, if the user is researching a topic, the user can discover who the user knows who has any information about a given topic, all without, as in prior art systems, having to mine or copy an individual's sensitive personal data to a centralized service.

Push info functional unit 320 contains a variety of data storage functions that may vary amongst different embodiments or implementations of the present invention. Push info functional unit 320 supports writing or storing or pushing information to other users; these operations may include adding, updating, or deleting information anywhere within the recipient's information sources, such as pushing updates to a user's profile. For example, FIG. 3 depicts push info functional unit 320 that contains profile update functions 322 and other update functions 324; e.g., update functions 324 could include functions for users to collaborate on documents by pushing updates back and forth.

Profile update functions 322 supports update operations to user profile information. A user's profile may consist of contact information, e.g., address, phone numbers, etc., as well as information not found in a typical address book record, such as dating status, resume summary, services offered, interests, etc. While people search functionality may help with those seeking introductions, profile update functionality may help those users who want to be discovered by other users for appropriate reasons or approved reasons.

One example of a profile push is sending out updated contact information. For example, if a user's phone number changes, the user can send out one profile update request to all or a portion of the user's social network. Receiving users may pre-designate to automatically accept updates from one or more senders, or the user may accept each update individually and manually. The present invention helps to automate the process of updating the recipient's address book accordingly.

For dating functions, a single woman may not want to actively seek dates but wants to be found by a romantically desirable man. This user could push out a profile update that indicates her dating availability and preferences to her contacts who might not otherwise know her status and preferences. Then eligible men can get introduced to her through mutual friends in their mutually connecting social networks.

For resume functions, a user's professional resume or resume summary may be included in the user's profile data. Anyone actively seeking a new job or merely wanting to be available for appropriate opportunities may include this resume information when pushing out a profile update to other users. Similarly, when a user is offering a service, such as a babysitter or a handyman, and the user wants to be discovered by those seeking to hire someone, the user may specify his/her service provider information when pushing out the user's profile update.

Figure 4:
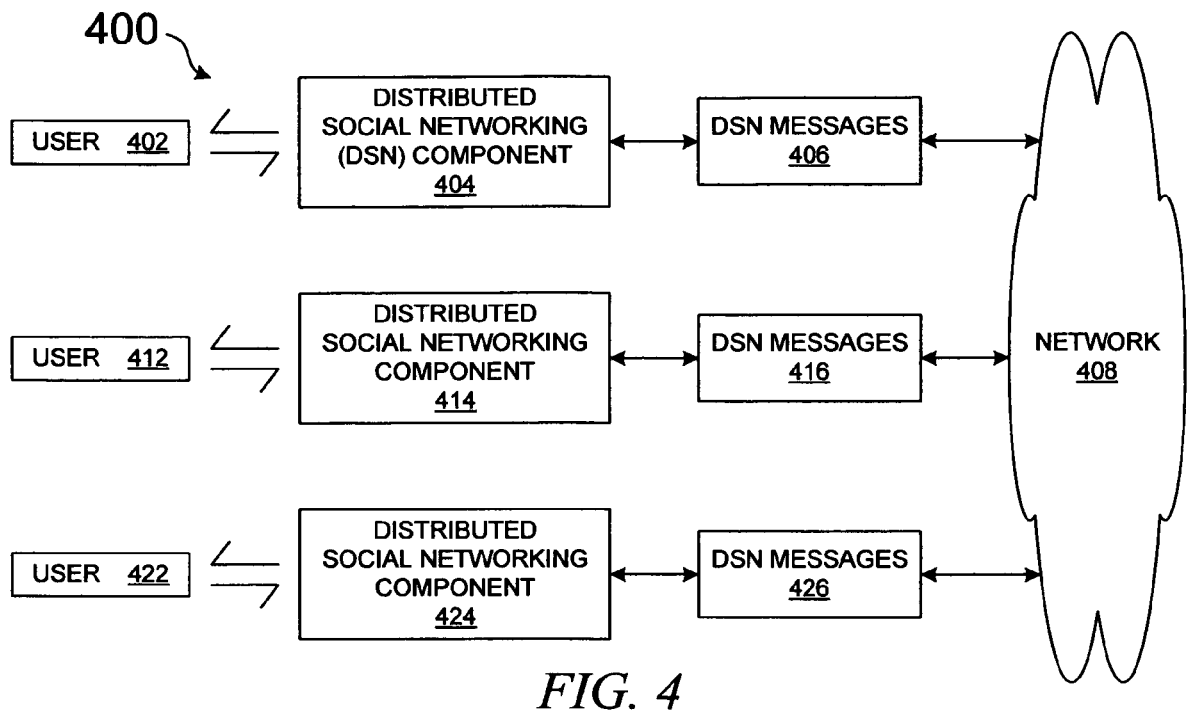
FIG. 4 illustrates a block diagram that depicts a distributed social networking context in which multiple users and their associated distributed functional components are interacting in accordance with an embodiment of the present invention.

With reference now to FIG. 4, a block diagram depicts a distributed social networking environment in which multiple users and their associated distributed functional components are interacting in accordance with an embodiment of the present invention. Social networking environment 400 illustrates the interaction of multiple users within a distributed social network. Social networking environment 400 is an informational representation, using computer hardware and/or computer software, of a social network of persons who have voluntarily participated in the organization of various types of information or data in order to electronically or logically represent the social network of persons; herein, the term "social network" or "distributed social network" can be understood to refer to the electronic or informational representation of a human social network by reference to its usage in the context of the description of the present invention.

User 402 interacts through a typical human-computer interface, e.g., through input/output devices as shown in FIG. 1B, with distributed social networking (DSN) component 404, which sends distributed social networking messages 406 through network 408 to other users who similarly interact with other instances of distributed social networking components. Similarly, user 412 interacts with distributed social networking component 414, which sends distributed social networking messages 416 through network 408, and user 422 interacts with distributed social networking component 424, which sends distributed social networking messages 426 through network 408, which is similar to network 102 and/or network 118 that is shown in FIG. 1A.

As noted hereinabove, the present invention may be implemented in a variety of hardware and software platforms. An embodiment of the present invention may be described as comprising multiple components in either hardware, software, or both, but for purposes of illustration, FIG. 4 depicts an embodiment of the present invention in which an instance of the functionality of the distributed social network of the present invention for a given user is contained within a single component; in FIG. 4, such instances are shown as DSN components 404, 414, and 424. Depending upon the implementation and/or installation of an embodiment of the present invention, DSN component 404 may be supported on a variety of different computing devices or computers that are not shown in FIG. 4 but are similar to those that are shown in FIG. 1A, such as client 110, phone 120, or PDA 130. In this manner, users and/or computers within a network can be described as participating in, or as operating to support, the distributed social networking functionality of the present invention without making explicit reference to one or more distributed social networking components.

Moreover, distributed social networking component 404 may be implemented in a variety form factors. By way of example and not limitation, DSN component 404 may be implemented as: a stand-alone program; an extension module to an Internet browser program or some other type of informational retrieval application; a module or a plug-in to an email client program, an instant messaging program, or some other type of messaging program; a set of dynamic load libraries for use under the control of an operating system; or a module within some other type of stand-alone program.

It should be noted that DSN messages are not necessarily transceived while users are providing input or obtaining output. It should also be noted that other instances of distributed social networking components are not necessarily transceiving DSN messages concurrently amongst each other. In other words, although a given embodiment of the present invention may have functions that operate synchronously, a typical embodiment of the present invention would have functions that operate asynchronously.

FIG. 4 illustrates, at a high level, some of the differences between the distributed and decentralized social networking functionality of the present invention and the social networking functionality of a typical prior art centralized social networking service. Prior art centralized social networking services require users to register with the social networking service, whereby user profiles are created from the personal data that is provided by a registering user and stored within a centralized database; in this manner, the social networking service manages the user's personal data, and the user relinquishes control over that personal data. Moreover, in the prior art, social networking connections between users are generated and managed in a centralized manner.

In contrast, the present invention does not require centralized functionality nor centralized data management of any kind. FIG. 4 illustrates that the social networking functionality of the present invention is decentralized and distributed; it does not require the typical prior art functionality of a centralized social networking service, which is not shown in FIG. 4. Prior art centralized social networking services might continue to operate somewhere within network 408 concurrently with an embodiment of the present invention; in other words, centralized social networking services may operate within network 408 while distributed social network environment 408 also operates within network 408, though the present invention does not require interaction with such other types of social networking systems. While an embodiment of the present invention might provide functionality such that it can interface and interoperate with a typical prior art centralized social networking service, embodiments of the present invention are contemplated as functioning without such interoperability because users of the present invention have greater privacy and more control over the management of their personal data than what is provided by prior art centralized social networking services, as explained in more detail hereinbelow.

Figure 5:
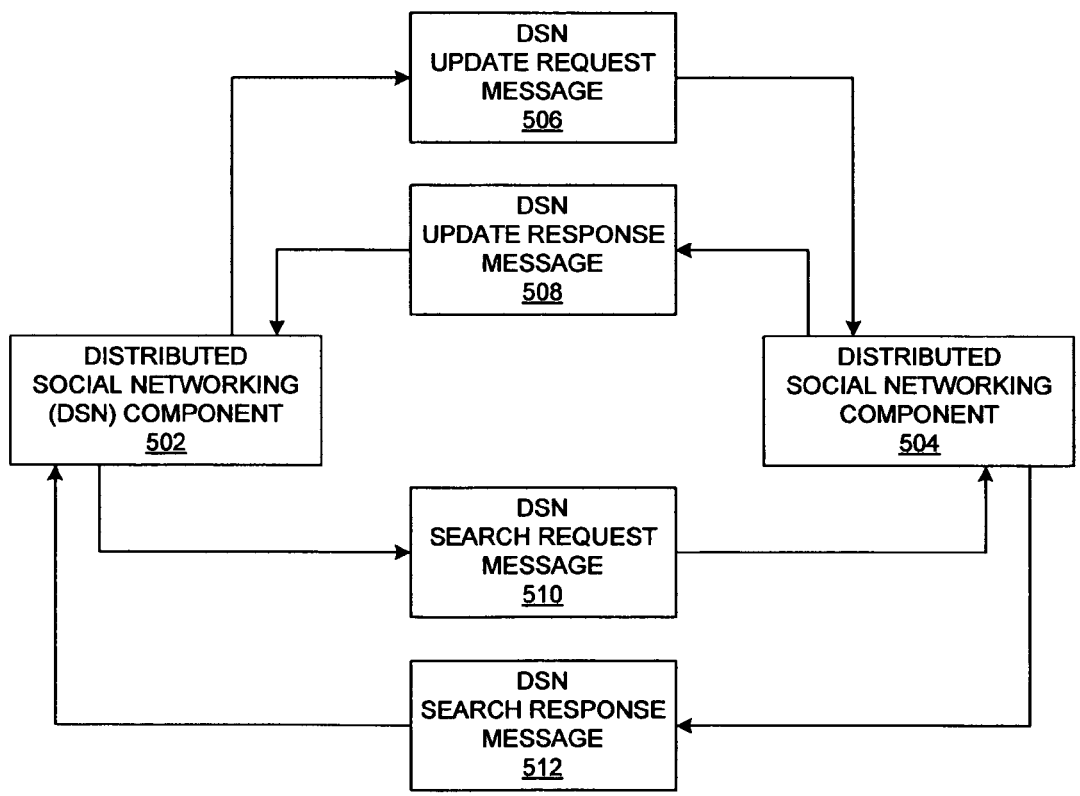
FIG. 5 illustrates a block diagram that depicts an exchange of distributed social networking messages within a distributed social networking environment that is implemented in accordance with an embodiment of the present invention.

With reference now to FIG. 5, a block diagram depicts an exchange of distributed social networking messages within a distributed social networking environment that is implemented in accordance with an embodiment of the present invention. In FIG. 5, distributed social networking components 502 and 504 exchange information through a process of transceiving messages in order to support an embodiment of the distributed social networking functionality of the present invention.

A variety of DSN request messages and DSN response messages may be exchanged between users of the present invention or between devices supporting the present invention. By way of example, FIG. 5 illustrates that DSN component 502 sends DSN update request message 506 to DSN component 504. DSN update request message 506 contains data or information that is being pushed from DSN component 502 to DSN component 504. DSN update request message 506 may be generated at DSN component 502 in multiple different ways, e.g., automatically by satisfaction of programmatic logical decision criteria within DSN component 502 and/or under specific command and control by a user of DSN component 502. DSN update request message 506 may represent an update of personal information for the user of DSN component 502; e.g., the personal information may be a portion of the user's contact information that represents a new telephone number. DSN request messages may contain a variety of types of data or information, as explained in more detail hereinbelow.

At some later point in time, in response to receiving and processing DSN request message 506, DSN component 504 may optionally return DSN update response message 508 to DSN component 502. DSN response request message 508 may be generated in multiple different ways, e.g., either automatically by satisfaction of programmatic logical decision criteria within DSN component 504 and/or under specific command and control by a user of DSN component 504. DSN response messages may contain various types of data or information, as explained in more detail hereinbelow.

As mentioned hereinabove, an exchange of DSN messages may be supported in a given embodiment of the present invention such that DSN messages are exchanged in an asynchronous and/or synchronous manner. Moreover, in a given embodiment of the present invention, DSN messages may or may not be necessarily acknowledged in a transmit-and-expect-acknowledgement manner or in a receive-and-must-acknowledge manner. For example, more specifically with respect to the illustration of an exchange of DSN messages in FIG. 5, an embodiment of the present invention may not require DSN component 502 to expect a receipt of DSN response message 508 in response to its sending of DSN request message 506; likewise, an embodiment of the present invention may not require DSN component 504 to send DSN response message 508 in response to its receipt of DSN request message 506.

Although multiple messages are illustrated within FIG. 5, FIG. 5 does not necessarily illustrate a chronological depiction of message traffic nor a snapshot of message traffic. In FIG. 5, multiple messages are not necessarily being concurrently transceived between DSN component 502 and DSN component 504, and multiple message are not necessarily being subsequently transceived between DSN component 502 and DSN component 504.

By way of another example of an exchange of DSN messages, FIG. 5 illustrates that DSN component 502 sends DSN search request message 510 to DSN component 504. Other DSN components or other DSN users could have been illustrated within FIG. 5. Although FIG. 5 illustrates the exchange of two request messages sent or transmitted from DSN component 502 to DSN component 504 and two response messages received by DSN component 502 from DSN component 504, the illustration in FIG. 5 should not be interpreted as requiring the exemplary sequence of DSN messages within an embodiment of the present invention.

DSN search request message 510 contains data that represents a search, i.e., a query, for information to be pulled to DSN component 502 from DSN component 504 or possibly from other DSN components or other DSN users, as explained in more detail hereinbelow. DSN search request message 510 may be generated in multiple different ways, e.g., either automatically by satisfaction of programmatic logical decision criteria within DSN component 504 and/or under specific command and control by a user of DSN component 504. DSN search request message 510 may represent a query from the user of DSN component 502 for a recommendation of a plumber from the user of DSN component 504 or from other users of the implementation of the present invention; in other words, a user may be querying to obtain the contact information for a plumber from one or more users of the distributed social networking system of the present invention. At some later point in time, in response to receiving and processing DSN search request message 510, DSN component 504 may optionally return DSN search response message 512 to DSN component 502.

FIG. 5 illustrates that the social networking functionality of the present invention is decentralized and distributed; it does not require the typical prior art functionality of a centralized social networking service, which is not shown in FIG. 5. In a typical prior art centralized social networking service, even though users may be employing Internet browsers to view information, information is passed between the users of the centralized social networking service through their interaction with a centralized server and its supporting centralized database(s).

In contrast, the present invention employs messaging technology with standard messaging protocols in a novel manner to support communication between users of the distributed social networking functionality of the present invention. As shown in FIG. 5, users of an implementation of the present invention are able to exchange data and information in support of their social networking goals without requiring, as is required in the prior art, that their personal data must be placed in messages that are routed through a centralized service and associated servers and databases. Although the exchange of messages between users of the present invention may be routed through typical messaging servers, the messages between users of the present invention are not under the management and control of a centralized social networking service. In this manner, an implementation of the present invention supports a decentralized and distributed exchange of information amongst the users of the novel social networking functionality of the present invention. For example, although not illustrated within FIG. 5, in response to receiving DSN update request message 506 or DSN search request message 510, DSN component 504 may optionally generate additional DSN request messages that are sent from DSN component 504 to additional users of other DSN components, which are not illustrated within FIG. 5; in this manner, the original request message can be forwarded to multiple users, as is described in more detail with respect to FIG. 6.

With reference now to FIG. 6, a block diagram depicts a replication and subsequent decentralized distribution of social networking messages within a distributed social networking environment that is implemented in accordance with an embodiment of the present invention. DSN component 602, which is similar to the DSN components that are shown in FIG. 4 and FIG. 5, receives DSN search request message 604. As mentioned hereinabove, a DSN component may optionally generate additional DSN request messages that are sent from a DSN component to additional users within the distributed social networking system of the present invention. In this manner, these additional DSN request messages represent a decentralized distribution of the original DSN request message, thereby expanding the reach of the original request message and possibly multiplying the results of the original request message while also possibly increasing the quality of the result of the original request message.

After receiving DSN search request message 604 and deciding to forward it, DSN component 602 generates new DSN search request messages 606-610, which may be modified copies of DSN search request message 604. While FIG. 6 illustrates multiple DSN search request messages 606-610, DSN component 602 does not necessarily send these messages concurrently; e.g., these messages may be sent sequentially as needed until a satisfactory DSN search result message is received.

DSN component 602 accesses its user's personal information database 612, which may consist of local and remote datastores, in order to read electronic address book 614 and thereby obtain additional unique messaging identifiers, e.g., such as email addresses, of other users of an implementation of the distributed social networking system of the present invention. If DSN component 602 is a computer that is configured to be able to be used by multiple users, then personal information database 612 corresponds to the current user of DSN component 602. The retrieved unique messaging identifiers of the other users are written into the modified copies of the received DSN search request message in order to provide the modified copies with destination addresses. DSN search request messages 606-610 are then sent to DSN components 616-620, which may subsequently return DSN search response messages to the user of DSN component 602 and/or to the user of the DSN component that originated the initial DSN search request message 604.

With reference now to FIG. 7A, a block diagram depicts an exemplary format for a DSN request message that may be used to communicate between users of an implementation of the distributed social networking functionality of the present invention. Distributed social networking request message 700 contains multiple data elements; other implementations of the present invention may employ DSN request messages that contain additional data elements, fewer data elements, or a different set of data elements.

As mentioned hereinabove, implementations of the present invention may employ standard messaging protocols in a novel manner to achieve the distributed social networking functionality of the present invention. Alternatively, proprietary messaging protocols may be employed, although various techniques for translating message formats and for handling message interface transfers may need to be employed in order to allow the DSN functionality of the present invention to interoperate to the maximum extent possible in a heterogeneous environment like the Internet.

To this end, DSN request message 700 contains messaging protocol headers 702 and other message parts to the extent necessary to comply with a messaging protocol that is employed within the distributed social networking system, and unique messaging identifier 704 is a data element that has a value that represents a unique identifier for a given user for messaging purposes. Hence, depending upon the manner in which the present invention is implemented, the format and/or content of messaging protocol headers 702 and unique messaging identifier 704 may vary, e.g., depending upon whether DSN messages are supported within an email infrastructure, within an instant messaging infrastructure, or in some other manner of electronic messaging.

For example, DSN request message 700 may be transceived within a Simplified Mail Transport Protocol (SMTP) subsystem in accordance with a well-known standard that is described within publication "RFC 5321—Simplified Mail Transport Protocol". In this example, DSN request message 700 may be formatted in accordance with a well-known standard that is described within publication "RFC 5322—Internet Message Format"; unique messaging identifier 704 may represent the "To:" field, i.e., the intended recipient of DSN request message 700. Other portions of a DSN request message may be formatted in accordance with a well-known standard that is described within publication "RFC 2045—Multipurpose Internet Mail Extensions (MIME) Part One: Format of Internet Message Bodies".

Security data 706 represents any security-related data that may be included to ensure the privacy of other data elements within DSN request message 700. For example, security data 706 may represent various data elements that support encryption and/or digital signatures in accordance with well-known protocols and algorithms within the PKI (public key infrastructure) framework.

DSN processing parameters 708 represent any data that may be employed by the originating DSN component to indicate various options that should performed by the receiving DSN component when processing DSN request message 700 after its receipt. DSN processing parameters 708 may be included in a variety of manners that depends upon the implementation of the present invention, e.g., automatically by satisfaction of programmatic logical decision criteria within a DSN component and/or under specific command and control by a user of a DSN component.

For example, the user who originated DSN request message 700 may have operated a DSN component to explicitly indicate that DSN request message 700 should not be forwarded by the receiving user and/or the receiving DSN component that is operated by the receiving user. In that case, a "No Forwarding" flag could be set or included within DSN request message 700 within DSN processing parameters 708. Otherwise, as another example, a non-zero value for a "Maximum Hop Count" parameter could indicate that DSN request message 700 should be forwarded, and the value of an incrementable "Current Hop Count" parameter would indicate whether the maximum number of forwarding operations had yet been reached; both of these parameters could be included within DSN request message 700 within DSN processing parameters 708.

DSN request message 700 includes data directive 710. One purpose of data directive 710 may be to indicate whether data or information is being pushed to the receiving DSN component and/or the receiving DSN user or whether the originating/sending DSN component and/or the originating DSN user desires to pull data or information from the receiving DSN component and/or the receiving DSN user. In other words, data directive 710 may indicate a request to retrieve data from a computer that is used by the receiving user to a computer that is used by the originating user, i.e., a data-pull operation. Alternatively, data directive 710 may indicate a request for receipt of data from a computer that is used by the originating user to a computer that is used by the receiving user, i.e., a data-push operation. In some embodiments of the present invention, the data-push operation and the data-pull operation are not necessarily mutually exclusive, and data directive 710 may indicate a combined operation in which some data is pushed to the receiving DSN component while concurrently attempting to pull some data from the receiving DSN component.

Data directive 710 may be formatted in a variety of manners as necessary to fulfill its purpose within the processing operations for the DSN request message. In some embodiments, data directive 710 may simply be data, although the data may be formatted in a variety of complex formats. For example, in a case in which contact information is between exchanged between users, data directive 710 may be formatted in accordance with the well-known vCard standard as described in publication "RFC 2426—vCard MIME Directory Profile".

In one embodiment of the present invention, data directive 710 comprises executable instructions, e.g., an executable plug-in or a Java™ applet. In such cases, user approval by the receiving user might be required to be obtained prior to further processing of a received DSN request message; processing options, such as user approval, may be preference parameters that can be specified by the receiving user in the user's installation of an implementation of the present invention. In one example, an executable data directive may be used to ensure that a data-push operation from the originating user to the receiving user can be accomplished in a secure manner such that the execution of the data directive initiates a secure data transfer by the executing data directive from the originating DSN component to the receiving DSN component, e.g., in a case in which a secure authorization operation needs to be performed by the executing data directive. In another example, an executable data directive may be used to accomplish a data-pull operation in which the executing data directive performs some type of specialized search operation at the receiving DSN component.

In another embodiment of the present invention, data directive 710 comprises input parameters for previously configured rules at the receiving DSN component. In such cases, a rules engine within the receiving DSN component may interpret one or more appropriate rules in conjunction with the received input parameters. The resulting output by the rules engine could be data that is stored at the receiving DSN component, thereby accomplishing a type of data-push operation from the originating DSN component to the receiving DSN component. Alternatively, the resulting output by the rules engine could be data that is transmitted from the receiving DSN component to the originating DSN component, thereby accomplishing a type of data-pull operation to the originating DSN component from the receiving DSN component.

In yet another embodiment of the present invention, data directive 710 comprises a search string or a search query, e.g., as input into an SQL (Structured Query Language) database engine. The resulting output by the database engine could be data that is transmitted from the receiving DSN component to the originating DSN component, thereby accomplishing a type of data-pull operation to the originating DSN component from the receiving DSN component.

With reference now to FIG. 7B, a block diagram depicts an exemplary format for a DSN response message that may be used to communicate between users of an implementation of the distributed social networking functionality of the present invention. DSN response message 720 that is shown in FIG. 7B is analogous to DSN request message 700 that is shown in FIG. 7A. DSN response message 720 contains messaging protocol headers 702 and other message parts to the extent necessary to comply with a messaging protocol that is employed within the distributed social networking system, and unique messaging identifier 704 is a data element that has a value that represents a unique identifier for a given user for messaging purposes.

Distributed social networking response message 720 contains multiple data elements; other implementations of the present invention may employ DSN response messages that contain additional data elements, fewer data elements, or a different set of data elements. DSN response message 720 may contain response codes 722 for reporting various types of response status information from a receiving DSN component to an originating DSN component in response to the processing of a DSN request message from the originating DSN component at the receiving DSN component. DSN response message 720 may contain response data 724, e.g., for returning search result data or other data for various types of data-pull operations by an originating DSN component from the receiving DSN component.

Figure 8:
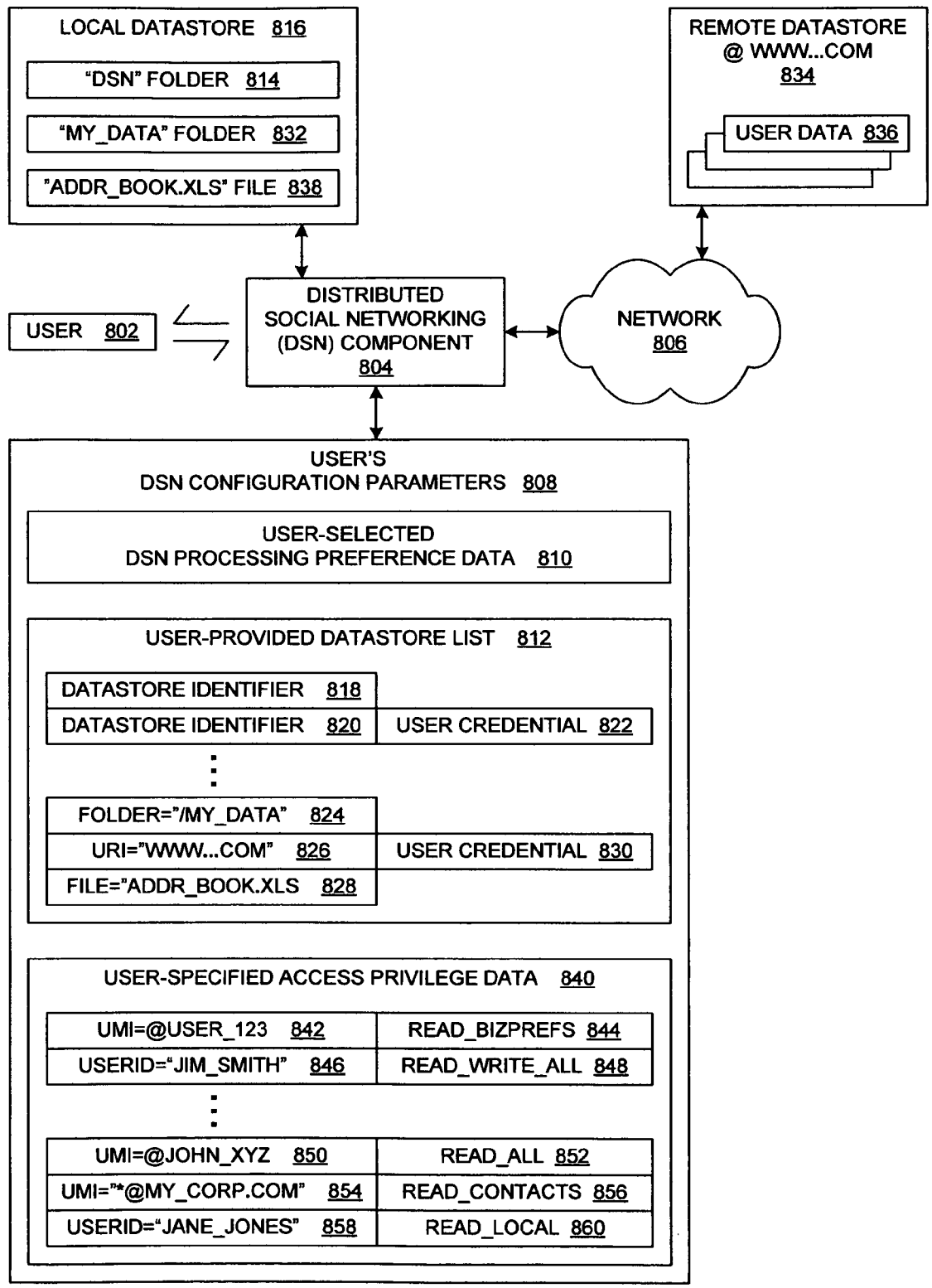
FIG. 8 illustrates a block diagram that depicts user-configured data and user-specified data that may be used by a DSN component to perform the distributed social networking functionality by an embodiment of the present invention.

With reference now to FIG. 8, a block diagram depicts user-configured data and user-specified data that may be used by a DSN component to perform the distributed social networking functionality by an embodiment of the present invention. In a manner similar to FIG. 4, FIG. 8 shows user 802 interacting with DSN component 804, which transceives messages through network 806 with other DSN components, which are not shown. In the exemplary embodiment of the present invention that is illustrated in FIG. 8, user 802 is able to configure DSN configuration parameters 808 for DSN component 804. User-selected DSN processing preference data 810 allows user 802 to configure various processing flags within DSN component 804 in order to guide or direct the manner in which it operates. For example, one set of processing flags may indicate the events for which DSN component 804 is required to obtain approval from user 802 prior to performing further processing. In one embodiment, such flags may allow user 802 to review received DSN request messages before they are further processed so that user 802 may override any operations that DSN component 804 may have subsequently performed automatically.

In yet another embodiment, such flags may allow user 802 to determine whether or not DSN component 804 queues DSN request messages or DSN response messages for viewing by user 802, with or without an associated approval operation; another flag may be available that indicates the DSN component 804 should merely generate a log of its actions. Hence, in some implementations, user 802 may not be aware that DSN component 804 has performed any processing of DSN request messages on the user's behalf. For example, DSN component 804 may receive and process a DSN search request message yet not find any data that fulfills the parameters of the DSN search request message; DSN component 804 may then delete the DSN search request message, whether or not DSN component 804 has returned a DSN response message, and user 802 may not be aware that any processing has occurred. In other cases, DSN component 804 may generate reviewable copies of DSN request messages and DSN response messages, which are placed in a queue or a log or a folder, such that user 802 may review them at some later point in time.

DSN configuration parameters 808 also contains user-provided datastore list 812, which is a list of datastore identifiers; this list has been configured by user 802 in order to inform DSN component 804 of the locations at which DSN component 804 should store and/or retrieve user data while performing its processing functions on behalf of user 802. Other information about the datastores may also be stored as necessary in order to interact with the identified datastore. These datastores may be local datastores, remote datastores, or both.

It should be noted, however, that DSN component 804 may not be limited to accessing data only within the datastores that are indicated within user-provided datastore list 812. Other datastores may be accessed by DSN component 804, such as folder 814 within local datastore 816; in this example, folder 814 may be a default folder that is configured by DSN component 804 to hold data for a user unless a user has specified otherwise. Through the use of user-provided datastore list 812, user 802 is able, to some degree if not completely, to direct the storage and retrieval operations of DSN component 804 while it is performing its functions.

Datastore identifiers 818 and 820 are entries in user-provided datastore list 812. User credential 822 is associated with datastore identifier 820; user credential 822 is employed by DSN component 804 to obtain authorized access to data that is stored at a location that is indicated by datastore identifier 820, e.g., for those data services that provide a mechanism for DSN component 804 to act as a proxy for user 802 rather than requiring user 802 to actively perform an authentication function whenever data needs to be accessed at the indicated location.

In the example that is shown in FIG. 8, user-provided datastore list 812 contains other datastore identifiers as list entries 824, 826, and 828, while list entry 826 has an associated user credential 830. List entry 824 indicates a datastore identifier of "/MY_DATA" folder 832 on local datastore 816. Folder 832 may contain various types of files and databases within which DSN component 804 may retrieve or store data while processing DSN messages. List entry 826 indicates a Uniform Resource Identifier (URI) for a data service on remote datastore 834. DSN component 804 may employ user credential 830 while accessing user data 836 on remote datastore 834. List entry 828 indicates a datastore identifier of "ADDR_BOOK.XLS" file 838, which may contain addresses and other contact information for friends, family, and colleagues of user 802.

DSN configuration parameters 808 also contain user-specified access privilege data 840, by means through which user 802 has specified any access privileges that user 802 is giving to other users within the distributed social networking system with respect to accessing the user data or personal data of user 802.

For example, when DSN component 804 processes a received DSN message, DSN component 804 determines that the DSN message was originated by a given user. In most cases, DSN component 804 needs to store or retrieve data, e.g., to or from a datastore as indicated in user-provided datastore list 812, in order to continue processing the received DSN message. However, user 802 may not want to allow access to some or all of the user's data, and user 802 may desire to specify such restrictions on a per-user basis. Hence, while processing a received DSN message but prior to accessing the user/personal data of user 802, DSN component 804 checks user-specified access privilege data 840 to determine whether or not the originating user of the received DSN message has the proper access privileges to the user/personal data of user 802 as necessary to complete the processing of the received DSN message.

The data specifications that are used to define user identifiers and to define access privileges may vary across different implementations of the present invention. Moreover, the manner in which data is stored to identify other users of the distributed social networking system along with their corresponding access privileges may vary across different implementations of the present invention.

In the example that is shown in FIG. 8, user-specified access privilege data 840 contains usernames or other user identifiers that are paired with the appropriate user-specified access privileges; usernames or other user identifiers may be used to lookup the associated access privileges that were previously specified by user 802. The usernames or other user identifiers may be defined by the unique messaging identifiers of one or more messaging protocols that are used to support the execution of an implementation of the distributed social networking functionality of the present invention; other embodiments or implementations may use other data schemes. Data values for access privileges may be defined by the operating system that is supporting the execution of DSN component 804, or alternatively, the data values may be proprietary definitions; other embodiments or implementations may use other data schemes.

Referring again to the exemplary user-specified access privilege data that is illustrated within FIG. 8, this example illustrates a proprietary definition scheme for access privileges in which a finer granularity is exhibited when compared to a typical simple access privilege scheme of "read-only" or "read-and-write". User identifier 842 is paired with access privilege data 844; the user that is identified by the unique messaging identifier of "@USER_123" is associated with access privilege value 844 of "READ_BIZPREFS". Access privilege value 844 may indicate that the specified user has access privileges or permission to read or obtain the business preference data of user 802 wherever such data is stored within the personal data of user 802, e.g., throughout any of the datastores that have been specified by user 802 using datastore list 812; the business preference data could represent the preferred businesses, such as restaurants or plumbers, that user 802 would recommend to other users of the distributed social network system. For example, user 802 receives a DSN request message, and the originating user of the received DSN request message may or may not have access privileges to the data that satisfies the request. DSN component 804 obtains an identifier for the originating user, e.g., by extracting a unique messaging identifier from the received DSN request message. DSN component 804 then obtains the access privileges for the originating user, e.g., by performing a lookup operation using the originating user's identifier as a key. After obtaining the access privilege data for the originating user, DSN component 804 may determine that the originating user is not able to access the data that is necessary to fulfill the received DSN request message. In a case in which DSN component 804 determines that it needs to access address book file 838 in order to satisfy the DSN request, DSN component 804 determines that it cannot fulfill the original request because the originating user only has access privileges or permission to read or obtain the business preference data of user 802; in other words, the originating user only has access to a portion of the personal data of user 802, but the originating user's request requires access to a different portion of the personal data of user 802. In that case, DSN component 804 may return an appropriate status code in a DSN response message that indicates that the search was unsuccessful.

User identifier 846 is paired with access privilege data 848; the user that is identified by the user identifier of "JIM_SMITH" is associated with access privilege value 848 of "READ_WRITE_ALL", which may indicate that the specified user has access privileges or permission to read from, and to write to, any personal data of user 802 wherever such data is stored within the previously specified datastores. For example, the specified user may be a family member of user 802, and user 802 allows the specified user to have all access privileges to all personal data.

User identifier 850 is paired with access privilege data 852; the user that is identified by the unique messaging identifier of "@JOHN_XYZ" is associated with access privilege value 852 of "READ_ALL", which may indicate that the specified user has access privileges or permission to read from any personal data of user 802 wherever such data is stored within the previously specified datastores.

User identifier 854 is paired with access privilege data 856; any user that is identified by the unique messaging identifier of "*@MY_CORP.COM" is associated with access privilege value 856 of "READ_CONTACTS". In this case, a set of multiple users are specified; the specified users are the set of users whose unique messaging identifiers match the wildcard string. Hence, in this case, all employees of a given corporation have access privileges or permission to read any contact information within the personal data of user 802 wherever such data is stored within the previously specified datastores, e.g., address book file 838 and other files.

User identifier 858 is paired with access privilege data 860; the user that is identified by the user identifier of "JANE_JONES" is associated with access privilege value 860 of "READ_LOCAL", which may indicate that the specified user has access privileges or permission to read from any personal data of user 802 but only to the extent that such data is stored within a local datastore.

Figure 9:
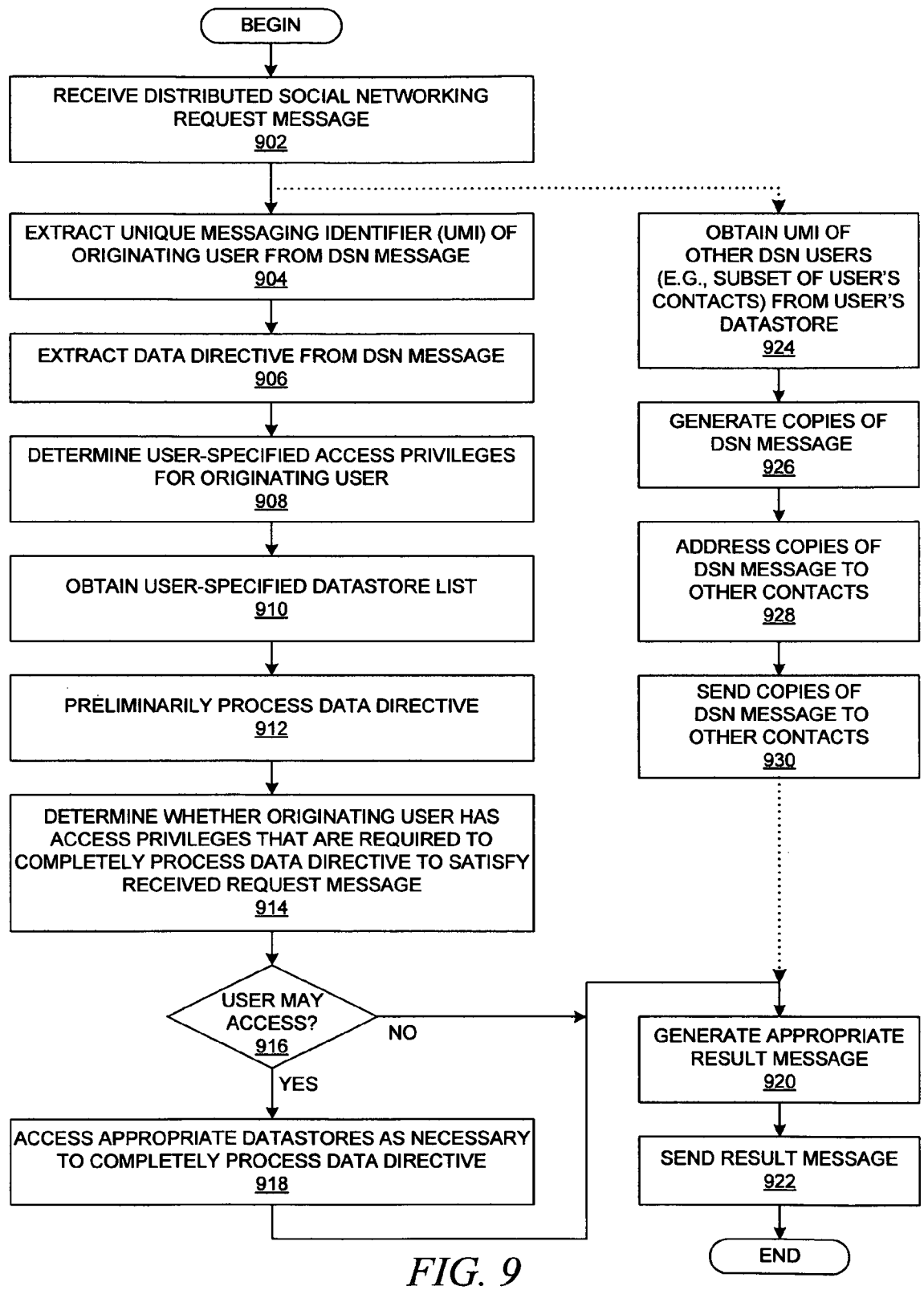
FIG. 9 illustrates a flowchart that depicts a process by which a DSN component may process a received DSN message in accordance with an embodiment of the present invention.

With reference now to FIG. 9, a flowchart depicts a process by which a DSN component may process a received DSN message in accordance with an embodiment of the present invention. Most or all of the steps of the method or process that are illustrated in FIG. 9 have been previously described hereinabove in reference to other figures with respect to the description of the operations of an embodiment of the present invention; some steps may be performed in a different order in different implementations or embodiments of the present invention, and some steps may be optionally performed in different implementations or embodiments of the present invention.

The depicted process commences when a DSN component that is operated by a user of the novel distributed social network functionality of the present invention has received a DSN request message (step 902). The DSN component extracts a unique messaging identifier that is associated with the DSN user who originated the received message (step 904) and also extracts a data directive from the received DSN message (step 906). The DSN component determines the access privileges of the originating user as specified by the user of the DSN component (step 908). The DSN component obtains a datastore list and its associated information for accessing the distributed personal data of the user of the DSN component as specified by the user (step 910).

The DSN component then preliminarily processes the data directive by examining the requirements to fulfill the completion of its processing (step 912). For example, the DSN component may examine the datastores that have been specified by the user and may make a preliminary determination about whether those datastores may contain data that can be retrieved to fulfill a DSN search request message. Alternatively, the DSN component may examine the datastores that have been specified by the user and may make a preliminary determination about whether those datastores comprise storage locations in which to store data that has been received in a DSN update request message.

The DSN component then determines whether the originating user of the received DSN request message has the access privileges that are required to access the appropriate datastores in order to completely process the received data directive (step 914). If the originating user has the proper access privileges to the appropriate datastores (step 916), then the DSN component accesses those datastores in the appropriate manner to read data and/or to write data as necessary to completely process the data directive (step 918). The DSN component then generates an appropriate DSN response message (step 920) and sends it to the originating user (step 922). If the originating user does not have the proper access privileges to the appropriate datastores at step 916, then the DSN component would generate the appropriate error codes to be returned in the DSN response message at steps 920 and 922. The DSN component would then wait for the receipt of another DSN request message and begin its processing at step 902.

It should be noted that steps 920 and 922 are optional; as was discussed above with respect to FIG. 5, the DSN component optionally does not return a response message when the processing of the received DSN request message has been completed. Under various circumstances, a DSN response message may or may not be returned. For example, if the originating user does not have the proper access privileges to search appropriate datastores, then a DSN response message may not be returned. In other cases, as described above with respect to FIG. 8, a user may set various types of processing flags; these flags may be retrieved at any step within FIG. 9 in order to direct the operation of the DSN component. These flags may prevent processing of certain types of DSN request messages, or the flags may allow the user to override the operations of the DSN component; in those cases, a DSN response message may not be returned. In yet other cases, a DSN request message may be fully processed, but because no positively responsive data has been found, then a DSN response message may not be returned.

Referring again to FIG. 9, at some point between the receipt of the DSN request message and the return of a DSN response message, the DSN component may forward copies of the previously received DSN request message, as described in FIG. 6; steps 924-930 may occur concurrently with any subset of steps 904-922. The DSN component obtains the unique messaging identifiers (UMIs) of other DSN users, e.g., a subset of persons from the local user's address book or some other local or remote datastore (step 924). The DSN component generates copies of the originally received DSN request message (step 926), and these copies are modified by inserting the list of UMIs that were obtained at step 924 into the newly generated copies as destination addresses (step 928). It should be noted that, as described hereinabove, other information may be included into these newly generated DSN request messages; hence, other modifications may be made to the copied message. The newly generated DSN request messages are then sent (step 930), and the process is concluded.

The advantages of the present invention should now be apparent with reference to the accompanying figures and the relevant detailed description of those figures as described hereinabove. Through the use of user-provided datastore lists, a user can control his/her own data storage in a distributed and decentralized manner; this mechanism contrasts sharply with the prior art social networking systems in which a user's data is managed and stored under the control of centralized servers. In conjunction with the flexible distributed storage scheme for personal data that is provided by the present invention, the present invention also provides a flexible scheme for specification of user access privileges such that users of the distributed social networking system of the present invention can control the extent to which they share personal data with other users; this also contrasts sharply with the prior art social networking systems in which a centralized server controls the extent to which other users may view another user's personal data.

More importantly, the decentralized nature of the distributed social network of the present invention eliminates the need for each relationship between users in the network to be restricted between registered users; this contrasts sharply with the prior art social networking systems in which users can only connect to other users through the centralized service and manage their connections to other users through the centralized service. The present invention allows the contact data of each user, as stored and managed by the users themselves, to form the basis of the users' connections, the users' associations, or the users' relationships without requiring each user to provide such contact data or without requiring each user to invite such other users; the users themselves manage their own data and connections. The present invention enables building a much more comprehensive and useful social network because users can now reach people, e.g., friends of friends of friends, who have the personality or behavior that declines to join typical, prior art, centrally managed, social networking services. With the present invention, one can reach far more people within fewer degrees of separation, and no "critical mass" of a minimum number of people is required before the distributed social network becomes useful because even just two users can reach many new contacts.

It is important to note that while the present invention has been described in the context of a fully functioning data processing system, those of ordinary skill in the art will appreciate that the processes of the present invention are capable of being distributed in the form of instructions in a computer-readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for transferring data between computers, wherein a computer has a central processing unit (CPU) for processing instructions and memory for storing data, the computer-implemented method comprising the steps of:

receiving a request message at a receiving computer from an originating computer, wherein the request message is addressed to a unique messaging identifier (UMI) that is uniquely associated with a user of the receiving computer and specifies the receiving user for purposes of electronic messaging, wherein the request message is addressed from a UMI that is uniquely associated with a user of the originating computer and specifies an originating user for purposes of electronic messaging, and wherein the request message includes a data directive that requests a retrieval of data from a computer that is used by the receiving user to a computer that is used by the originating user and/or requests a receipt of data from a computer that is used by the originating user to a computer that is used by the receiving user, the data directive including at least a finding description for existing data, instructions for directing that data including adding, modifying, and deleting data, data values and customized message text;

automatically processing, at the receiving computer, the request message to determine access privileges for the originating user with respect to access privileges that have been specified by the receiving user;

automatically accessing, by the receiving computer, a set of one or more datastores and reading or writing data to or from said data stores in accordance with the determined access privileges and the data directive, wherein the set of one or more datastores are stored on one or more direct access storage devices at the receiving computer and/or on one or more remote storage devices;

automatically retrieving, at the receiving computer, a set of datastore identifiers that are uniquely associated with a set of datastores, wherein the set of datastore identifiers has been specified by the receiving user, and wherein a datastore identifier identifies a datastore on a direct access storage device at the receiving computer and/or a datastore on a remote storage device;

automatically accessing, by the receiving computer, the set of datastores using the retrieved set of datastore identifiers and reading and/or writing data at one or more datastores in the set of datastores in accordance with the determined access privileges and the data directive; and automatically generating, by the receiving computer, one or more new request messages that are addressed to one or more UMIs in a set of UMIs that are uniquely associated with a set of users, wherein the set of UMIs has been specified by the receiving user, and wherein each of the one or more new request messages includes the data directive.

2. The method of claim 1 further comprising:

obtaining, at the receiving computer, user credentials of the receiving user; and employing the user credentials to act as a proxy to access a datastore on a remote storage device in accordance with the determined access privileges and the data directive.

3. The method of claim 1 further comprising:

automatically generating, at the receiving computer in response to accessing the set of datastores, a response message that is addressed to the originating user.

4. The method of claim 3 further comprising:

sending the response message from the receiving computer to the originating user.

5. The method of claim 1 further comprising:

automatically sending the one or more new request messages from the receiving computer.

6. The method of claim 1 further comprising:

requiring user input to send the one or more new request messages from the receiving computer.

7. The method of claim 1 further comprising:

prior to automatically generating the one or more new request messages, determining a subset of the set of UMIs in accordance with the determined access privileges.

8. The method of claim 1 further comprising:

prior to automatically generating the one or more new request messages, determining a subset of the set of UMIs based on one or more parameters in the request message.

9. The method of claim 1 further comprising:

prior to sending the one or more new request messages, determining whether to send a new request message based on a parameter in the request message.

10. The method of claim 1 further comprising:

prior to sending the one or more new request messages, determining whether to send a new request message based on success or failure at accessing the set of one or more datastores while reading and/or writing data for the data directive.

11. A computer-implemented method for transferring data between computers, wherein a computer has a central processing unit (CPU) for processing instructions and memory for storing data, the computer-implemented method comprising the steps of:

receiving, at a receiving computer, an electronic message by a receiving user from an originating user, wherein the electronic message includes a data directive that requests data retrieval by the originating user from the receiving user and/or that requests data receipt by the receiving user from the originating user, the data directive including at least a finding description for existing data, instructions for directing that data including adding, modifying, and deleting data, data values and customized message text;

automatically processing the electronic message to determine access privileges for the originating user with respect to access privileges that have been specified by the receiving user;

automatically accessing one or more datastores and reading and/or writing data in accordance with the determined access privileges and either/both the requested data retrieval or/and the requested data receipt, wherein the one or more datastores are stored locally and/or remotely;

automatically retrieving, at the receiving computer, a set of datastore identifiers that are uniquely associated with a set of datastores, wherein the set of datastore identifiers has been specified by the receiving user, and wherein a datastore identifier identifies a datastore on a direct access storage device at the receiving computer and/or a datastore on a remote storage device;

automatically accessing, by the receiving computer, the set of datastores using the retrieved set of datastore identifiers and reading and/or writing data at one or more datastores in the set of datastores in accordance with the determined access privileges and the data directive; and automatically generating one or more new request messages to one or more users that have been specified by the receiving user, and wherein each of the one or more new request messages includes the data directive.

12. The method of claim 11 further comprising:
automatically generating, at the receiving computer in response to accessing the set of datastores, a response message that is addressed to the originating user.

13. The method of claim 12 further comprising:
sending the response message from the receiving computer to the originating user.

14. The method of claim 11 further comprising:
automatically sending the one or more new request messages from the receiving computer.

15. The method of claim 11 further comprising:
requiring user input to send the one or more new request messages from the receiving computer.

16. The method of claim 11 further comprising:
prior to sending the one or more new request messages, determining whether to send a new request message based on success or failure at accessing the set of one or more datastores while reading and/or writing data for the data directive.

17. The method of claim 11 further comprising:
determining whether or not to notify the receiving user based on success or failure at accessing the set of one or more datastores while reading and/or writing data for the data directive.

18. The method of claim 11 further comprising:
determining not to notify the receiving user of receipt of the electronic message and/or of processing of the electronic message.

19. A computer-implemented method for transferring data between computers, wherein a computer has a central processing unit (CPU) for processing instructions and memory for storing data, the computer-implemented method comprising the steps of:

routing messages that are addressed to unique messaging identifiers (UMIs) that are uniquely associated with users of computers, wherein the messages include data directives that request retrieval of data from a receiving user to an originating user and/or that request receipt of data from the originating user to the receiving user, the data directive including at least a finding description for existing data, instructions for directing that data including adding, modifying, and deleting data, data values and customized message text;

automatically processing received messages to determine access privileges of users who have originated the received messages, wherein access privileges have been specified by users of the computers that have processed the received messages;

automatically accessing, in accordance with the determined access privileges, sets of datastores from computers that have processed the received messages, wherein the sets of datastores have been specified by users of the computers that have processed the received messages;

automatically retrieving a set of datastore identifiers that are uniquely associated with a set of datastores, wherein the set of datastore identifiers has been specified by the receiving user, and wherein a datastore identifier identifies a datastore on a direct access storage device at the receiving computer and/or a datastore on a remote storage device;

automatically accessing the set of datastores using the retrieved set of datastore identifiers and reading and/or writing data at one or more datastores in the set of datastores in accordance with the determined access privileges and the data directive; and automatically forwarding the received messages to sets of users, wherein the sets of users have been specified by users of the computers that have processed the received messages.

20. The method of claim 19 further comprising:
obtaining, at a receiving computer, user credentials of a receiving user; and
employing the user credentials to act as a proxy to access a datastore on a remote storage device in accordance with determined access privileges and a data directive.

21. The method of claim 19 further comprising:
automatically generating, at a receiving computer in response to accessing a set of datastores, a response message that is addressed to the originating user.

22. The method of claim 21 further comprising:
sending the response message from the receiving computer to the originating user.

23. The method of claim 19 further comprising:
requiring user input by the receiving user to approve forwarding one or more received messages to sets of users.

* * * * *

UNITED STATES PATENT AND TRADEMARK OFFICE
CERTIFICATE OF CORRECTION

PATENT NO. : 8,452,803 B2  
APPLICATION NO. : 12/386435  
DATED : May 28, 2013  
INVENTOR(S) : Samir Ghosh Page 1 of 2

It is certified that error appears in the above-identified patent and that said Letters Patent is hereby corrected as shown below:

In the Claims:

Corrections to claim 1, 12 and 21 as follows:

1. A computer-implemented method for transferring data between computers, wherein a computer has a central processing unit (CPU) for processing instructions and memory for storing data, the computer-implemented method comprising the steps of:
   receiving a request message at a receiving computer from an originating computer, wherein the request message is addressed to a unique messaging identifier (UMI) that is uniquely associated with a user of the receiving computer and specifies the receiving user for purposes of electronic messaging, wherein the request message is addressed from a UMI that is uniquely associated with a user of the originating computer and specifies the originating user for purposes of electronic messaging, and wherein the request message includes a data directive that requests a retrieval of data from a computer that is used by the receiving user to a computer that is used by the originating user and/or requests a receipt of data from the computer that is used by the originating user to the computer that is used by the receiving user, the data directive including at least a finding description for existing data, instructions for directing that data including adding, modifying, and deleting data, data values and customized message text;
   automatically processing, at the receiving computer, the request message to determine access privileges for the originating user with respect to access privileges that have been specified by the receiving user;
   automatically accessing, by the receiving computer, a set of one or more datastores and reading or writing data to or from said data stores in accordance with the determined access privileges and the data directive, wherein the set of one or more datastores are stored on one or more direct access storage devices at the receiving computer and/or on one or more remote storage devices;
   automatically retrieving, at the receiving computer, a set of datastore identifiers that are uniquely associated with a set of datastores, wherein the set of datastore identifiers has been specified by the receiving user, and wherein a datastore identifier identifies a datastore on a direct access storage device at the receiving computer or a datastore on a remote storage device;
   automatically accessing, by the receiving computer, the set of datastores using the retrieved set of datastore identifiers and reading and/or writing data at one or more datastores in the set of datastores in accordance with the determined access privileges and the data directive; and Signed and Sealed this  
Twenty-third Day of July, 2013

Teresa Stanek Rea  
*Acting Director of the United States Patent and Trademark Office*

CERTIFICATE OF CORRECTION (continued)

U.S. Pat. No. 8,452,803 B2

(claim 1 cont.)
automatically generating, by the receiving computer, one or more new request messages that are addressed to one or more UMIs in a set of UMIs that are uniquely associated with a set of users, wherein the set of UMIs has been specified by the receiving user, and wherein each of the one or more new request messages includes the data directive.

12. (Currently amended) A computer-implemented method for transferring data between computers, wherein a computer has a central processing unit (CPU) for processing instructions and memory for storing data, the computer-implemented method comprising the steps of:
receiving, at a receiving computer, an electronic message by a receiving user from an originating user, wherein the electronic message includes a data directive that requests data retrieval by the originating user from the receiving user and/or that requests data receipt by the receiving user from the originating user, the data directive including at least a finding description for existing data, instructions for directing that data including adding, modifying, and deleting data, data values and customized message text;
automatically processing the electronic message to determine access privileges for the originating user with respect to access privileges that have been specified by the receiving user;
automatically accessing one or more data stores and reading and/or writing data in accordance with the determined access privileges and one or both of the requested data retrieval and the requested data receipt, wherein the one or more datastores are stored locally and/or remotely;
automatically retrieving, at the receiving computer, a set of datastore identifiers that are uniquely associated with a set of datastores, wherein the set of datastore identifiers has been specified by the receiving user, and wherein a datastore identifier identifies a datastore on a direct access storage device at the receiving computer or a datastore on a remote storage device;
automatically accessing, by the receiving computer, the set of datastores using the retrieved set of datastore identifiers and reading and/or writing data at one or more datastores in the set of datastores in accordance with the determined access privileges and the data directive; and
automatically generating one or more new request messages to one or more users that have been specified by the receiving user, and wherein each of the one or more new request messages includes the data directive.

21. A computer-implemented method for transferring data between computers, wherein a computer has a central processing unit (CPU) for processing instructions and memory for storing data, the computer-implemented method comprising the steps of:
routing messages that are addressed to unique messaging identifiers (UMIs) that are uniquely associated with users of computers, wherein the messages include data directives that request retrieval of data from a receiving user to an originating user and/or that request receipt of data from the originating user to the receiving user, the data directive including at least a finding description for existing data, instructions for directing that data including adding, modifying, and deleting data, data values and customized message text;
automatically processing received messages to determine access privileges of users who have originated the received messages, wherein access privileges have been specified by users of the computers that have processed the received messages;
automatically accessing, in accordance with the determined access privileges, sets of datastores from computers that have processed the received messages, wherein the sets of datastores have been specified by the users of the computers that have processed the received messages;
automatically retrieving a set of datastore identifiers that are uniquely associated with a set of datastores, wherein the set of datastore identifiers has been specified by the receiving user, and wherein a datastore identifier identifies a datastore on a direct access storage device at the receiving computer or a datastore on a remote storage device;
automatically accessing the set of datastores using the retrieved set of datastore identifiers and reading and/or writing data at one or more datastores in the set of datastores in accordance with the determined access privileges and the data directive; and
automatically forwarding the received messages to sets of users, wherein the sets of users have been specified by the users of the computers that have processed the received messages.

UNITED STATES PATENT AND TRADEMARK OFFICE
CERTIFICATE OF CORRECTION

PATENT NO.         : 8,452,803 B2                                    Page 1 of 3
APPLICATION NO.    : 12/386435
DATED              : May 28, 2013
INVENTOR(S)        : Samir Ghosh It is certified that error appears in the above-identified patent and that said Letters Patent is hereby corrected as shown below:

In the Claims:

Column 23, lines 10-63, Claim 1 should read as follows:

1. A computer-implemented method for transferring data between computers, wherein a computer has a central processing unit (CPU) for processing instructions and memory for storing data, the computer-implemented method comprising the steps of:
    receiving a request message at a receiving computer from an originating computer, wherein the request message is addressed to a unique messaging identifier (UMI) that is uniquely associated with a user of the receiving computer and specifies the receiving user for purposes of electronic messaging, wherein the request message is addressed from a UMI that is uniquely associated with a user of the originating computer and specifies the originating user for purposes of electronic messaging, and wherein the request message includes a data directive that requests a retrieval of data from a computer that is used by the receiving user to a computer that is used by the originating user and/or requests a receipt of data from the computer that is used by the originating user to the computer that is used by the receiving user, the data directive including at least a finding description for existing data, instructions for directing that data including adding, modifying, and deleting data, data values and customized message text;
    automatically processing, at the receiving computer, the request message to determine access privileges for the originating user with respect to access privileges that have been specified by the receiving user;
    automatically accessing, by the receiving computer, a set of one or more datastores and reading or writing data to or from said data stores in accordance with the determined access privileges and the data directive, wherein the set of one or more datastores are stored on one or more direct access storage devices at the receiving computer and/or on one or more remote storage devices;
    automatically retrieving, at the receiving computer, a set of datastore identifiers that are uniquely This certificate supersedes the Certificate of Correction issued July 23, 2013.

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,452,803 B2

(claim 1 cont.)
associated with a set of datastores, wherein the set of datastore identifiers has been specified by the receiving user, and wherein a datastore identifier identifies a datastore on a direct access storage device at the receiving computer or a datastore on a remote storage device;

automatically accessing, by the receiving computer, the set of datastores using the retrieved set of datastore identifiers and reading and/or writing data at one or more datastores in the set of datastores in accordance with the determined access privileges and the data directive; and automatically generating, by the receiving computer, one or more new request messages that are addressed to one or more UMIs in a set of UMIs that are uniquely associated with a set of users, wherein the set of UMIs has been specified by the receiving user, and wherein each of the one or more new request messages includes the data directive.

Column 24, line 36 - Column 25, line 9, Claim 11 should read as follows:

11. A computer-implemented method for transferring data between computers, wherein a computer has a central processing unit (CPU) for processing instructions and memory for storing data, the computer-implemented method comprising the steps of:

receiving, at a receiving computer, an electronic message by a receiving user from an originating user, wherein the electronic message includes a data directive that requests data retrieval by the originating user from the receiving user and/or that requests data receipt by the receiving user from the originating user, the data directive including at least a finding description for existing data, instructions for directing that data including adding, modifying, and deleting data, data values and customized message text;

automatically processing the electronic message to determine access privileges for the originating user with respect to access privileges that have been specified by the receiving user;

automatically accessing one or more data stores and reading and/or writing data in accordance with the determined access privileges and one or both of the requested data retrieval and the requested data receipt, wherein the one or more datastores are stored locally and/or remotely;

automatically retrieving, at the receiving computer, a set of datastore identifiers that are uniquely associated with a set of datastores, wherein the set of datastore identifiers has been specified by the receiving user, and wherein a datastore identifier identifies a datastore on a direct access storage device at the receiving computer or a datastore on a remote storage device;

automatically accessing, by the receiving computer, the set of datastores using the retrieved set of datastore identifiers and reading and/or writing data at one or more datastores in the set of datastores in accordance with the determined access privileges and the data directive; and automatically generating one or more new request messages to one or more users that have been specified by the receiving user, and wherein each of the one or more new request messages includes the data directive.

Column 25, line 38 - Column 26, line 31, Claim 19 should read as follows:

19. A computer-implemented method for transferring data between computers, wherein a computer has a central processing unit (CPU) for processing instructions and memory for storing data, the computer-implemented method comprising the steps of:

routing messages that are addressed to unique messaging identifiers (UMIs) that are uniquely (claim 19 cont.)
associated with users of computers, wherein the messages include data directives that request retrieval of data from a receiving user to an originating user and/or that request receipt of data from the originating user to the receiving user, the data directive including at least a finding description for existing data, instructions for directing that data including adding, modifying, and deleting data, data values and customized message text;

automatically processing received messages to determine access privileges of users who have originated the received messages, wherein access privileges have been specified by users of the computers that have processed the received messages;

automatically accessing, in accordance with the determined access privileges, sets of datastores from computers that have processed the received messages, wherein the sets of datastores have been specified by the users of the computers that have processed the received messages;

automatically retrieving a set of datastore identifiers that are uniquely associated with a set of datastores, wherein the set of datastore identifiers has been specified by the receiving user, and wherein a datastore identifier identifies a datastore on a direct access storage device at the receiving computer or a datastore on a remote storage device;

automatically accessing the set of datastores using the retrieved set of datastore identifiers and reading and/or writing data at one or more datastores in the set of datastores in accordance with the determined access privileges and the data directive; and automatically forwarding the received messages to sets of users, wherein the sets of users have been specified by the users of the computers that have processed the received messages.